United States Patent
Sakai et al.

(12) 
(10) Patent No.: US 6,449,178 B1
(45) Date of Patent: Sep. 10, 2002

(54) MAGNETRON DRIVE STEP-UP TRANSFORMER AND TRANSFORMER OF MAGNETRON DRIVE POWER SUPPLY

(75) Inventors: Shinichi Sakai, Nara (JP); Makoto Mihara, Nara (JP); Kazuho Sakamoto, Kyoto (JP); Toyotsugu Matsukura, Nara (JP); Yohzoh Ishimura, Kashihara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/762,791
(22) PCT Filed: Jun. 15, 2000
(86) PCT No.: PCT/JP00/03892
§ 371 (c)(1),
(2), (4) Date: Jul. 9, 2001
(87) PCT Pub. No.: WO00/78100
PCT Pub. Date: Dec. 21, 2000

(30) Foreign Application Priority Data

| Jun. 15, 1999 | (JP) | 11-167921 |
| Jun. 15, 1999 | (JP) | 11-167922 |
| Dec. 27, 1999 | (JP) | 11-009837 |
| Dec. 27, 1999 | (JP) | 11-369873 |
| Dec. 27, 1999 | (JP) | 11-369874 |

(51) Int. Cl.[7] ............................................. H02M 7/537
(52) U.S. Cl. ............................................................ 363/131
(58) Field of Search ............................ 363/20, 21.01, 363/131, 132

(56) References Cited

U.S. PATENT DOCUMENTS

| 5,181,160 A | 1/1993 | Okamoto et al. |
| 5,300,744 A * | 4/1994 | Maehara et al. ............ 219/687 |
| 5,495,405 A * | 2/1996 | Fujimura et al. ............ 363/133 |
| 5,905,646 A * | 5/1999 | Crewson et al. ............ 363/132 |

FOREIGN PATENT DOCUMENTS

EP 0 807 942 11/1997

OTHER PUBLICATIONS

Arkadiy Kats et al. Application of Integrated Magnetics in Resonant Converters. Feb. 1997. pp. 925–930. Apec. Annual Applied Power Electronics Conference and Exposition, US, New York, IEEE.

* cited by examiner

Primary Examiner—Adolf Deneke Berhane
(74) Attorney, Agent, or Firm—Pearne & Gordon LLP

(57) ABSTRACT

A primary winding (1) and a secondary winding (2) are layered concentrically with a magnetic substance forming a main magnetic circuit (13) and the magnetic resistance of a subordinate magnetic circuit (14) placed between the primary winding (1) and the secondary winding (2) is adjusted, whereby a concentric multilayer winding transformer having an arbitrary coupling coefficient can be provided.

15 Claims, 23 Drawing Sheets

MAGNETRON DRIVE STEP-UP TRANSFORMER AND TRANSFORMER OF MAGNETRON DRIVE POWER SUPPLY

This application claims the benefit of International Application Number PCT/JP00/03892, which was published in English.

FIELD OF THE INVENTION

This invention relates to a high-frequency heater using a magnetron to execute dielectric heating, such as a microwave oven, and in particular to the configuration of a step-up transformer for driving a magnetron by using a switching power supply, and more particularly to a transformer comprising an inverter for converting large power from a commercial power supply into high-frequency, high-voltage power for driving a magnetron.

Further, this invention relates to a magnetron drive step-up transformer unit of a high-frequency heater using a magnetron to execute dielectric heating, such as a microwave oven, and in particular to a transformer structure to enhance the stability of a heater current for heating a magnetron filament and prevention performance of a short circuit of PS.

BACKGROUND OF THE INVENTION

Hitherto, as this kind of magnetron drive step-up transformer using a switching power supply, a step-up transformer comprising a primary winding 1, a secondary winding 2, and a heater winding 3 placed in parallel on the same axis as U-shaped magnetic substances 4 and 5 as shown in FIG. 22 has been generally used for the following reason.

For a magnetron drive power supply often handling large power, use of a zero-volt switching technique (ZVS technique) based on voltage resonance is mainstream to lighten the load of a power semiconductor; in the ZVS technique, a step-up transformer coupling coefficient needs to be set in the range of about 0.6 to 0.85 to provide a resonance voltage. Thus, it is difficult to use a transformer of concentric multilayer winding (the coupling coefficient is 0.9 or more because the coupling between windings is strong).

However, in the described configuration in the related art, an attempt to produce higher output of the magnetron falls easily into a situation in which the peak current flowing into the primary side of the step-up transformer is more increased and thus the magnetic substances used with the step-up transformer are easily saturated. To solve this problem, it is necessary to upsize the magnetic substance, namely, the transformer, causing a bottleneck in pursuing miniaturization of the power supply.

FIG. 23 is an external view of a step-up transformer in a related art. In the figure, numeral 201 denotes a bobbin made of a resin around which a primary winding 202, a secondary winding 203, a short proof winding 204 for preventing the primary and secondary windings from being shorted, and a heater winding 205 for supplying power for heating a cathode of a magnetron are wound. The portion of the bobbin 201 around which the secondary winding 203 is wound is divided into four winding grooves by partitions 206. First, the secondary winding is wound around the first winding groove and upon completion of a predetermined amount of the winding, then the remaining winding is wound around the second winding groove. Upon completion of a predetermined mount of the winding, then the remaining winding is wound around the third winding groove. Then, the remaining winding is wound around the fourth winding groove, so that the division winding of the secondary winding is completed. Thus, if aligned winding is not accomplished in each winding groove and partial winding disorder occurs, the division grooves around which the secondary winding is wound are insulated with resin and thus the risk of producing an electrical breakdown between the parts of the secondary winding can be excluded. Since the secondary winding consists of the winding divisions, heat generated by a copper loss on the secondary winding is dispersed into the winding grooves and is radiated, so that an excellent radiation characteristic, namely, an advantage of suppressing a temperature rise can be provided. Numeral 207 denotes a core made of ferrite, etc. The core 207 serves a magnetic circuit for transferring magnetic energy generated by an electric current of the primary winding 202 to the secondary winding 203. A resin core cover 208 for insulating the core 207 and the windings is attached. The description of the step-up transformer in the related art is now complete.

However, such a step-up transformer comprises the primary and secondary windings placed in parallel, thus a method of widening the winding width of the primary winding 202 for enlarging the exposure area for cooling or widening the winding width of the secondary winding 203 or increasing the number of divisions of the secondary winding 203 for enlarging the exposure area for providing a good heat radiation property is available to provide a good radiation property and temperature performance.

To use the step-up transformer with a microwave oven, etc., increasing output is an indispensable factor for speedy heating; to increase output, the energy transferred with the transformer also grows and a temperature rise needs to be suppressed for avoiding degradation of insulation performance. Thus, to provide a good heat radiation property for lowering the temperature, the transformer must be widened and upsized; this is a problem.

Further, hitherto, for this kind of inverter power unit, high-voltage power supply for driving a magnetron, the Unexamined Japanese Patent Application Publication No. Hei 5-121159 discloses a monolithic voltage resonance inverter of a single-terminal type. The inverter power unit converts power converted into a high frequency by the inverter into a high voltage through a step-up transformer and generates a high DC voltage appropriate for driving the magnetron by a voltage doubler rectifier circuit. According to the configuration, the step-up transformer can be miniaturized by converting power into a high frequency by the inverter and the circuitry is formed on a single board, so that a compact and lightweight magnetron drive power supply (inverter power supply) can be provided.

In the described configuration in the related art, an attempt to produce higher output of the magnetron falls easily into a situation in which the peak current flowing into the primary side of the step-up transformer is more increased and thus the magnetic substances used with the step-up transformer are easily saturated. To solve this problem, it is necessary to upsize the magnetic substance, namely, the transformer, causing a bottleneck in pursuing miniaturization of the power supply.

Still further, hitherto, for an inverter power unit for converting a commercial power supply into a high-frequency, high-voltage power supply for driving a magnetron, the Unexamined Japanese Patent Application Publication No. Hei 5-121159 discloses a monolithic voltage resonance inverter of a single-terminal type. The inverter power unit converts power converted into a high frequency by the inverter into a high voltage through a step-up transformer and generates a high DC voltage appropriate for driving the magnetron by a high-voltage circuit using multiplication voltage rectification or a rectifier circuit, whereby the step-up transformer can be miniaturized by converting power into a high frequency by the inverter and the circuitry is formed on a single board, so that a compact and lightweight magnetron drive power supply (inverter power supply) can be provided.

FIG. 24 is a side view of a step-up transformer 408 of a magnetron drive step-up transformer unit in a related art. In the figure, numeral 401 denotes a bobbin made of a resin around which a primary winding 402, a secondary winding 403, and a heater winding 404 for supplying power for heating a cathode of a magnetron are wound. Numeral 405 denotes a core made of a magnetic substance of a ferrite, etc. The core 407 serves the function of a magnetic circuit for transferring magnetic energy generated by an electric current of the primary winding 402 to the secondary winding 403. The windings are bound on terminal pins 406 and are dip-soldered. The step-up transformer 408 has the described configuration. The terminal pins 406 are inserted into holes made in a printed circuit board 407 and are dip-soldered.

On the other hand, FIG. 25 is an example of a circuit diagram of the magnetron drive step-up transformer unit, which is a typical monolithic voltage resonance type inverter, generally used with an electromagnetic cooker, a rice cooker, etc., including a microwave oven.

A full-wave rectifier circuit 410 converts a commercial power supply 409 into a unilateral power supply. A rectification filter 413 consisting of a choke coil 416 and a smoothing capacitor 417 smoothes an electric current and blocks leakage and entry of noise. Inductance viewed from the primary side of the step-up transformer 408 and a resonance capacitor 414 make up a resonance circuit. Numeral 415 denotes a switching element made up of an IGBT (insulated gate bipolar transistor) and an FWD (forward diode). The parts make up an inverter section 416 of a switching circuit; a DC power supply of the rectification filter 413 is fast switched by the switching element 415 and is converted into a high-frequency power supply. High-frequency power is converted into high-frequency high-voltage power by the step-up transformer 408 and is further converted into a high DC voltage by a half-wave voltage doubler circuit 420 made up of high-voltage diodes 417 and 418 and a high-voltage capacitor 419, driving a magnetron 421 for generating microwave energy.

On the other hand, power is supplied from the heater winding 404 to the filament of the magnetron 421 for raising temperature, thereby promoting excitation of electrons. A control circuit 422 controls the inverter section 416 and the amount of microwave energy generated from the magnetron 421 is controlled by controlling the switching element 415. To block leakage of high-frequency noise from the magnetron 421, the power supply line to the filament is provided with a choke coil 423. In such an inverter system similar to monolithic voltage resonance of single terminal type, generally the control circuit 422 changes the conduction time of the switching element 415 for controlling power supply to the magnetron 421.

According to the control technique, the energy given to foods can be changed as desired and means for controlling power for warming foods up linearly can be provided. This is a feature that cannot be provided by a conventional iron-type transformer; at the time, the operation frequency of the inverter changes. As the power is lowered, the conduction time of the magnetron current flowing is shortened, and the voltage of the secondary winding is lowered remarkably as compared with the primary winding. Therefore, if the heater winding is coupled with the primary winding more strongly than with the secondary winding as much as possible, the current flowing into the cathode of the magnetron 421 at the power control time is less changed. As in the transformer in FIG. 24, the heater winding 404 is provided between the primary winding 402 and the secondary winding 403. The time change of anode-cathode voltage ebm and filament current If of the magnetron at the time becomes as shown in FIG. 27, and If is comparatively less changed by power control.

If tends to lower with lower output because of power transfer attenuation caused by the inductance component of the choke coil 423 caused by higher frequency at the lower time and coupling of the secondary winding, but it is advantageous for moding and it is made possible to narrow high-frequency output to low power.

On the other hand, considering a safety standpoint, the heater winding 404 for generating the highest voltage in the secondary circuit is brought close to the primary winding 402 and the configuration is extremely dangerous from the viewpoint of a short circuit of PS. Particularly, the secondary side is a high voltage and thus in the circuitry of a microwave oven wherein the cabinet chassis is at ground potential of the secondary side, if the chassis is not grounded, when a short circuit of PS occurs, the cabinet floats at a high voltage of about 4 kV to 7 kV; the configuration is extremely dangerous for the user.

Placing emphasis on the safety standpoint, the configuration as shown in FIG. 26 is possible, wherein the dangerous heater winding is placed on the opposite side to the primary winding 402. In this case, the risk of a short circuit of PS can be almost circumvented and the configuration is safety.

However, seeing the time change of the filament current If in FIG. 27, the value of If tends to extremely lower in response to power control; this is extremely disadvantageous from the viewpoint of moding of the magnetron.

Thus, a trade-off occurs between safety and performance.

Still further, hitherto, in this kind of magnetron drive step-up transformer using a switching power supply, a primary winding 501, a secondary winding 502, and a heater winding 503 have been wound around one bobbin 504 and have been placed in parallel on the same axis as U-shaped magnetic substances 505 and 506, as shown in FIG. 28. A primary winding terminal part 507 has been placed in a bobbin flange part 508 adjacent to the primary winding 501 of the bobbin 504 and a secondary winding terminal part 509 and a heater winding terminal part 510 at high potential have been placed in a bobbin flange part 511 adjacent to the heater winding 503 of the bobbin 504 considering an insulation structure of the primary winding 501 and the primary winding terminal part 507, as shown in FIG. 29. Insertion holes 513 for inserting the primary winding terminal part 507, the secondary winding terminal part 509, and the heater winding terminal part 510 have been made in a printed circuit board 512 on which a high-voltage circuit, a magnetron heater, and a switching circuit are print-wired for fixing the step-up transformer; after the terminal parts are inserted, solder fixing and print wiring have been carried out.

The described magnetron drive step-up transformer in the related art has the advantage that more than one winding can be wound around one bobbin; however, it involves the following problem in a state in which the step-up transformer is soldered, fixed, and wired on the printed circuit board: The primary winding terminal part print-wired to the switching circuit connected to a commercial power supply and the secondary winding terminal part and the heater winding terminal part printed-wired to the high-voltage circuit and the magnetron heater at high potential are connected in margins of the back and the surface of the printed circuit board. If dust should be deposited on the printed circuit board or dew condensation should occur on the printed circuit board due to salt air in a seaside area, there is a possibility of a high-voltage short circuit from the secondary winding terminal part or the heater winding terminal part at high potential to the primary winding terminal part because of margin discharge.

To prevent the accident from occurring, as shown in FIG. 30, a copper foil part 515 print-wired at the same potential as chassis ground is printed at a position between the primary winding terminal part 507 and the secondary winding terminal part 509 and the heater winding terminal part 510 on the copper foil print side of the printed circuit board 514 and discharge from the secondary winding terminal part 509 or the heater winding terminal part 510 at high potential is guided into the copper foil part 515 and is connected to the chassis ground for preventing a high-voltage short circuit to the primary winding terminal part 507. A conductive metal part 516 is placed at a position between the primary winding terminal part 507 and the secondary winding terminal part 509 and the heater winding terminal part 510 on the parts mount side of the printed circuit board 514 and moreover the metal part 516 is print-wired so as to become the same potential as the chassis ground, whereby discharge from the secondary winding terminal part 509 or the heater winding terminal part 510 at high potential is guided into the metal part 516 and is connected to the chassis ground for preventing a high-voltage short circuit to the primary winding terminal part 507. If a conductive metal part cannot be placed because of the structure, a printed circuit board 517 is formed with a slit 518 to provide the margin distance between the primary winding terminal part 507 and the secondary winding terminal part 509 and the heater winding terminal part 510 as shown in FIG. 31, whereby margin discharge from the secondary winding terminal part 509 or the heater winding terminal part 510 at high potential to the primary winding terminal part 507 is made hard to occur in the presence of the slit 518.

However, to thus prevent a high-voltage short circuit from the secondary winding terminal part or the heater winding terminal part at high potential to the primary winding terminal part by executing margin discharge on the parts mount side of the printed circuit board, a metal part needs to be placed at a position between the primary winding terminal part and the secondary winding terminal part and the heater winding terminal part of the magnetron drive step-up transformer or the printed circuit board needs to be formed with a slit. To place a metal part, insulation between the metal part and the windings must also be provided and thus the magnetron drive step-up transformer is enlarged in the height direction; this is a problem. To form a slit, the distance across the bobbin flange for placing the primary winding terminal part, the secondary winding terminal part, and the heater winding terminal part, namely, the winding width direction of the bobbin of the magnetron drive step-up transformer must be enlarged, and since the printed circuit board is formed with a slit, the risk of breaking the printed circuit board due to drop or vibration is increased; this is also a problem.

DISCLOSURE OF THE INVENTION

In the invention, to solve the problem, a primary winding and a secondary winding are layer-wound concentrically with respect to the magnetic substance forming a main magnetic circuit and the magnetic substance forming a subordinate magnetic circuit is placed between the primary winding and the secondary winding, whereby a leakage flux is generated.

According to the invention, the subordinate magnetic circuit placed between the primary winding and the secondary winding makes it possible to control the leakage amount between the primary winding and the secondary winding, and any desired coupling coefficient can be provided in a concentric multilayer winding transformer.

The concentric multilayer winding transformer, which has strong coupling between windings, has a feature of making the magnetic substance hard to be saturated even for a large current; consequently, the step-up transformer can be miniaturized effectively even for higher output.

According to the invention as in aspect 1, 2, or 3, it is made possible to adjust the coupling coefficient as desired in the presence of the subordinate magnetic circuit, the concentric multilayer winding transformer can provide a magnetron drive step-up transformer adopting the ZVS technique, and a miniaturized power supply that can prevent a magnetic substance from being saturated with higher output can be realized.

According to the invention as in aspect 4, 5, or 6, the leakage flux amount can be adjusted for providing any desired coupling coefficient.

It is therefore an object of the invention to provide a transformer having a primary winding and a secondary winding concentrically with the primary winding placed outside and the secondary winding placed inside and having a predetermined space provided between the primary winding and the secondary winding.

According to the invention as in aspects 7, 8, or 9, it is made possible to place the secondary winding in the inside of the bobbin of the primary winding and the space factor can be lessened drastically. Moreover, the air layer is provided between the primary winding and the secondary winding for enhancing insulation of the primary winding and the secondary winding, so that an unsafe mode of a short circuit of PS, etc., is hard to occur, and the whole of the primary winding which a large current of several ten amperes flows into and generates large heat is exposed to the outside atmosphere, thus the cooling performance is improved remarkably and high output of a microwave oven can be produced using a compact step-up transformer.

In the invention, to solve the problem, a magnetron drive step-up transformer comprises a primary winding, a secondary winding being placed inside the primary winding with a predetermined gap therebetween, and a subordinate magnetic circuit for generating a leakage flux between the primary winding and the secondary winding, wherein the subordinate magnetic circuit comprises an E-shaped magnetic substance placed at one end outside the primary winding and the secondary winding and placed at an opposite end between the primary winding and the secondary winding.

According to the invention as in aspect 10, there is provided a magnetron drive step-up transformer comprising a primary winding, a secondary winding being placed inside the primary winding with a predetermined gap therebetween, and a subordinate magnetic circuit for generating a leakage flux between the primary winding and the secondary winding, wherein the subordinate magnetic circuit comprises an E-shaped magnetic substance placed at one end outside the primary winding and the secondary winding and placed at an opposite end between the primary winding and the secondary winding, whereby the space factor can be lessened drastically. Moreover, the air layer is provided between the primary winding and the secondary winding for enhancing insulation of the primary winding and the secondary winding, so that an unsafe mode of a short circuit of PS, etc. , is hard to occur, and the whole of the primary winding which a large current of several ten amperes flows into and generates large heat is exposed to the outside atmosphere, thus the cooling performance is improved remarkably and high output of a microwave oven can be produced using a compact step-up transformer.

The subordinate magnetic circuit placed between the primary winding and the secondary winding makes it possible to adjust the coupling coefficient as desired, the concentric multilayer winding transformer can provide a magnetron drive step-up transformer using a voltage resonance technique, and a miniaturized power supply that can prevent a magnetic substance from being saturated with higher output can be realized.

In the invention as in aspect 11, the thickness and gap of the E-shaped magnetic substance are determined so that the coupling coefficient is set to 0.7 to 0.9 by adjusting the magnetism of the subordinate magnetic circuit. Thus, if the thickness of the E-shaped magnetic substance is examined, a stable area with magnetism unsaturated can be set and if the gap of the E-shaped magnetic substance is adjusted, the coupling coefficient can be adjusted to 0.7 to 0.9. Therefore, a hole of the optimum dimensions of an outer bobbin responsive to the thickness of the E-shaped magnetic substance is determined and a small and compact step-up transformer can be provided.

In the invention as in aspect 12, a spacer placed in a gap of the subordinate magnetic circuit is molded integrally with an outer bobbin, whereby the difficulty of attaching a small spacer to the depth of a hole for inserting the opposite end of the E-shaped magnetic substance is excluded, and the E-shaped magnetic substances are inserted from both sides of the hole, whereby the opposite ends of the E-shaped magnetic substances do not come in direct contact each other and the resin spacer is placed between the opposite ends of the E-shaped magnetic substances; an abnormal sound offensive to ears is not produced and the spacer need not again be inserted, namely, workability is good.

In the invention, to solve the problem, a step-up transformer comprises three types of windings of a primary winding, a secondary winding, and a heater winding, magnetic substances for transferring power of a switching circuit as a magnetic flux from the primary winding to another winding, an outer bobbin around which the primary winding is wound, and an inner bobbin around which the secondary winding and the heater winding are around, the inner bobbin being placed inside the outer bobbin, the windings being wound as concentric layers with respect to a magnetic circuit of the magnetic substance.

According to the invention, in the outer bobbin comprising the primary winding, the inner bobbin comprising the secondary winding and the heater winding is inserted as a two-piece structure, so that a short circuit of PS is extremely hard to occur in the safe structure and the heater winding exists just below the primary winding, thus the magnetic coupling between the primary winding and the heater winding is high, magnetic flux change at the power control time is small, and change in the current flowing into a filament is also lessened. Therefore, a magnetron drive step-up transformer unit having stable performance wherein change in filament current If is reduced and moding is hard to occur to low output can be provided.

According to the invention as in aspect 13, there is provided a magnetron drive step-up transformer unit comprising a magnetron, a step-up transformer for supplying a drive voltage to the magnetron, and a switching circuit being connected to the primary side of the step-up transformer, wherein the step-up transformer comprises three types of windings of a primary winding, a secondary winding, and a heater winding, magnetic substances for transferring power of the switching circuit as a magnetic flux from the primary winding to another winding, an outer bobbin around which the primary winding is wound, and an inner bobbin around which the secondary winding and the heater winding are around, the inner bobbin being placed inside the outer bobbin, the windings being wound as concentric layers with respect to a magnetic circuit of the magnetic substance.

Thus, the insulation of the primary and secondary windings is enhanced, variation in the filament current at the power change time is lessened, and moding becomes hard to occur.

In the invention as in aspect 14, the windings are wound as concentric layers with respect to the magnetic substance forming a main magnetic circuit and the outer bobbin and the magnetic substance forming a subordinate magnetic circuit are between the primary winding and the secondary winding and the heater winding.

Thus, the subordinate magnetic circuit makes it possible to adjust the coupling coefficient as desired, excitation of resonance voltage is intensified, stable zero-voltage switching can be realized, and the switching loss of the switching element can be decreased remarkably.

In the invention, to solve the problem, a first winding, a second winding, and a third winding of a step-up transformer are wound as concentric layers around two or more bobbins with respect to a magnetic substance forming a magnetic circuit, the bobbins are provided at appropriate positions with terminal parts of the windings, one of the bobbins is provided with a terminal part of magnetic substance ground brought into contact with the magnetic substance, the terminal part of the first winding and the terminal parts of the second and third windings are placed so as to face each other with the magnetic substance between, the winding terminal parts of the step-up transformer are soldered and fixed to a printed circuit board, and the first winding is connected to a switching circuit, the second and third windings are connected to a high-voltage circuit and a heater of a magnetron, and the terminal part of the magnetic substance ground is connected to chassis ground.

According to the invention, if dust should be deposited on the printed circuit board or dew condensation should occur on the printed circuit board due to salt air in a seaside area and a state should be entered in which margin discharge easily occurs in the direction of the terminal part of the first winding connected to the switching circuit from the terminal parts of the second and third windings connected to the high-voltage circuit and the heater of the magnetron at high potential, the terminal parts of the second and third windings face the terminal part of the first winding with the magnetic substance between, so that discharge occurs from the terminal parts of the second and third windings to the magnetic substance and an electric current flows into the chassis ground connected through the magnetic substance ground terminal from the magnetic substance, making it possible to prevent a high-voltage short circuit to the terminal part of the first winding connected to the switching circuit.

Therefore, the configuration eliminates the need for placing a conductive metal part at a position between the terminal part of the first winding and the terminal parts of the second and third windings on the printed circuit board and moreover print-wiring the metal part so as to become the same potential as the chassis ground as in the related art and also eliminates the need for enlarging the margin distance by providing a slit at a position between the terminal part of the first winding and the terminal parts of the second and third windings on the printed circuit board; the step-up transformer or the printed circuit board can be miniaturized and the strength can also be increased against breakage of the printed circuit board due to drop or vibration.

In other words, the step-up transformer can be miniaturized although output is made large, and the power supply can be miniaturized.

According to the invention as in aspect 15, there is provided a magnetron drive step-up transformer unit comprising a magnetron, a high-voltage circuit for supplying a high voltage to the magnetron, a step-up transformer for supplying a drive voltage to a heater of the magnetron and the high-voltage circuit, a switching circuit being connected to the primary side of the step-up transformer, and a printed circuit board on which the high-voltage circuit, the heater of the magnetron, and the switching circuit are print-wired for fixing the step-up transformer wherein a first winding, a second winding, and a third winding of the step-up transformer are wound as concentric layers around two or more bobbins with respect to a magnetic substance forming a magnetic circuit, wherein the bobbins are provided at appropriate positions, for example, flange part with terminal parts of the windings, wherein one of the bobbins is provided with a terminal part of magnetic substance ground brought into contact with the magnetic substance, wherein the terminal part of the first winding and the terminal parts of the second and third windings are placed so as to face each other with the magnetic substance between, wherein the winding terminal parts of the step-up transformer are soldered and fixed to the printed circuit board, and wherein the first winding is connected to the switching circuit, the second and third windings are connected to the high-voltage circuit and the heater of the magnetron, and the terminal part of the magnetic substance ground is connected to chassis ground.

Therefore, if dust should be deposited on the printed circuit board or dew condensation should occur on the printed circuit board due to salt air in a seaside area and a state should be entered in which margin discharge easily occurs in the direction of the terminal part of the first winding connected to the switching circuit from the terminal parts of the second and third windings connected to the high-voltage circuit and the heater of the magnetron at high potential, the terminal parts of the second and third windings face the terminal part of the first winding with the magnetic substance between, so that discharge occurs from the terminal parts of the second and third windings to the magnetic substance and an electric current flows into the chassis ground connected through the magnetic substance ground terminal from the magnetic substance; a high-voltage short circuit to the terminal part of the first winding connected to the switching circuit can be prevented.

In the magnetron drive step-up transformer unit as in aspect 16, the space distance between the terminal part of the second winding and the magnetic substance is made smaller than a half the space distance between the terminal part of the first winding and the terminal part of the second winding and the space distance between the terminal part of the third winding and the magnetic substance is made smaller than a half the space distance between the terminal part of the first winding and the terminal part of the third winding. The effect of preventing a high-voltage short circuit can be made larger.

PREFERRED EMBODIMENTS OF THE INVENTION (1st Embodiment)

Figure 1:
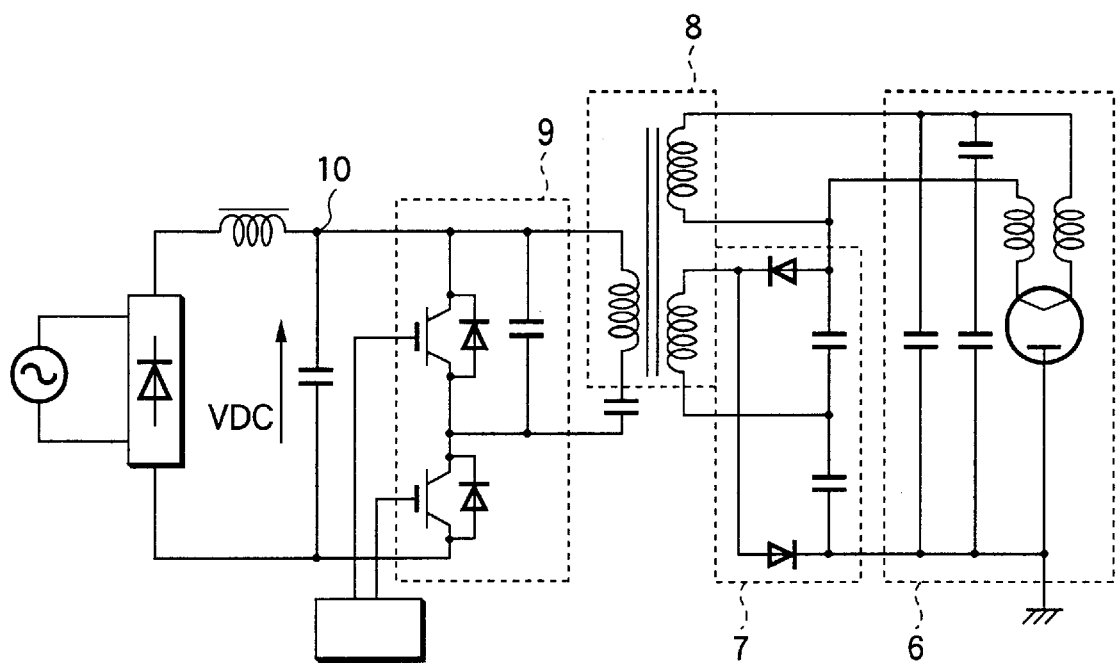
FIG. 1 is a diagram to show the configuration of a magnetron drive power supply using a magnetron drive step-up transformer of the invention, wherein 6 is a magnetron, 8 is a step-up transformer, and 9 is a switching section.
Figure 2:
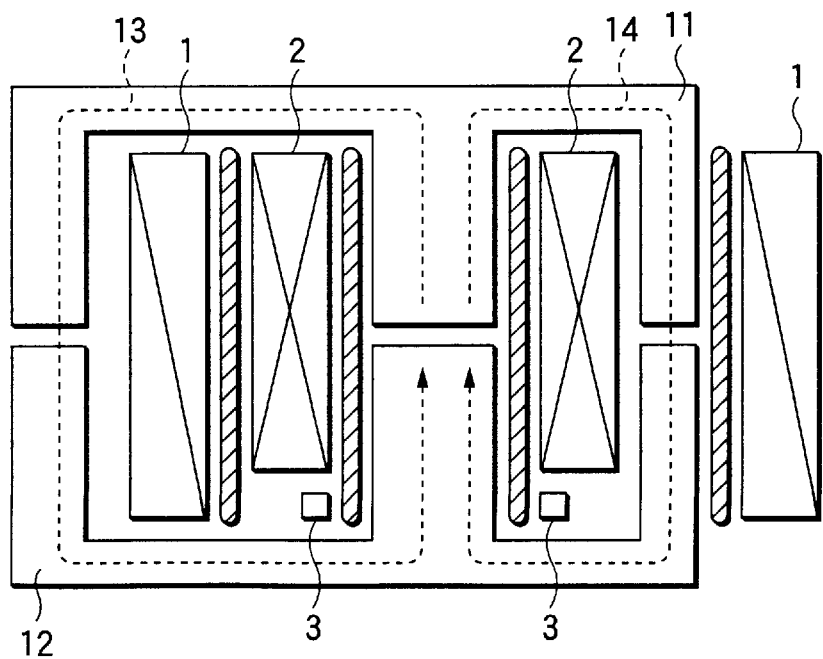
FIG. 2 is a sectional view of the configuration of the step-up transformer in a 1st embodiment of the invention, wherein 1 is a primary winding, 2 is a secondary winding, 11 and 12 are magnetic substances, 13 is a main magnetic circuit, and 14 is a subordinate magnetic circuit.

FIG. 1 is a diagram to show the configuration of a magnetron drive power supply using a magnetron drive step-up transformer 8 of the invention. FIG. 2 is a sectional view of the configuration of the step-up transformer 8.

A magnetron drive power supply has a magnetron 6, a high voltage doubler rectifier circuit 7 for voltage doubler rectifying, a step-up transformer 8 for supplying stepped-up voltage to the magnetron 6, a switching section 9 connected to the primary side of the step-up transformer 8, and a DC power supply 10.

The step-up transformer 8 consists of a primary winding 1, a secondary winding 2, a heater winding 3, and E-shaped magnetic substances 11 and 12, and the primary winding 1 and the secondary winding 2 are wound as concentric layers with respect to a main magnetic circuit 13.

A subordinate magnetic circuit 14 exists between the primary winding 1 and the secondary winding 2. Considering power transfer from the primary side to the secondary side, an attempt is made to transfer power from the primary winding 1 to the secondary winding 2 in the main magnetic circuit 13 and the subordinate magnetic circuit 14, but power is not transferred to the secondary winding 2 in the subordinate magnetic circuit 14, and a leakage flux is produced.

Thus, magnetic resistance of the subordinate magnetic circuit 14 is adjusted, whereby the coupling coefficient between the primary winding 1 and the secondary winding 2 can be set to any desired value.

In the description of the embodiment, the primary winding 1 is placed outside and the secondary winding 2 is placed inside; however, if the primary winding 1 is placed inside and the secondary winding 2 is placed outside, a similar advantage can be provided, of course. The heater winding 3 may be placed at any desired position.

(2nd Embodiment)

Figure 3:
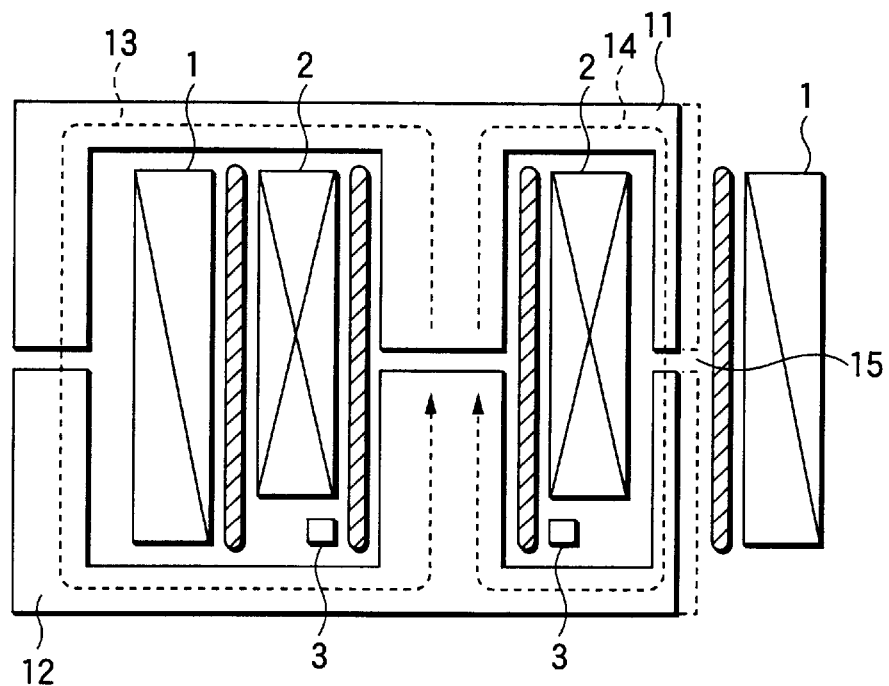
FIG. 3 is a schematic representation of a step-up transformer in a 2nd embodiment of the invention.

FIG. 3 is a schematic representation of a step-up transformer in a 2nd embodiment of the invention. Parts identical with those previously described with reference to FIG. 2 are denoted by the same reference numerals in FIG. 3 and will not be discussed again in detail.

In FIG. 3, if the area of subordinate magnetic circuit 14 portion of E-shaped magnetic substance 11, 12 is lessened from the dashed line portion to the solid line portion, the magnetic resistance of the subordinate magnetic circuit 14 is increased assuming that a gap 15 is constant; consequently, the coupling coefficient of a primary winding 1 and a secondary winding 2 is enlarged.

Thus, the cross-sectional area of the subordinate magnetic circuit is increased or decreased, whereby it is made possible to adjust the coupling coefficient.

(3rd Embodiment)

Figure 4:
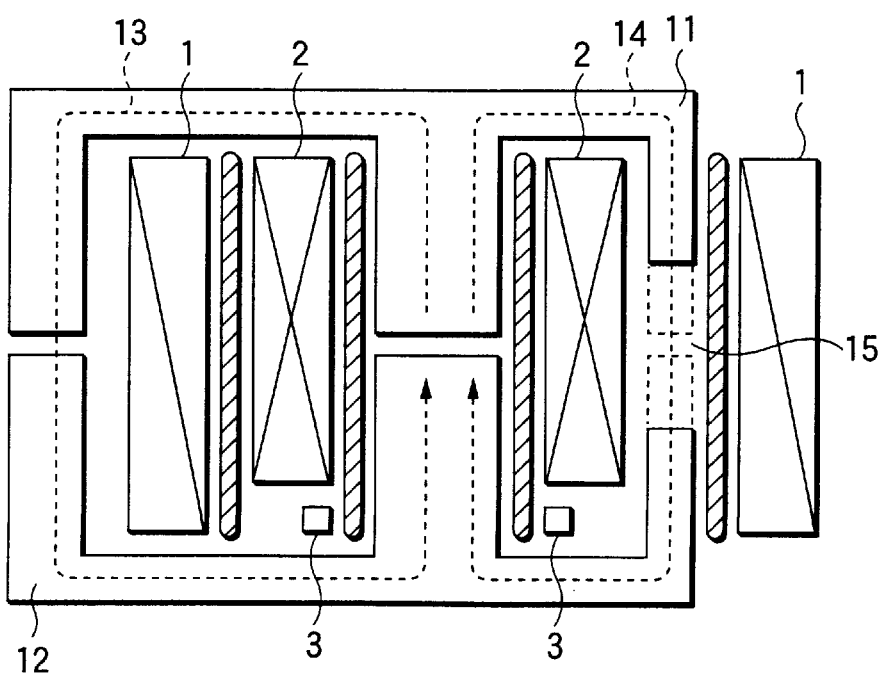
FIG. 4 is a schematic representation of a step-up transformer in a 3rd embodiment of the invention.

FIG. 4 is a schematic representation of a step-up transformer in a 3rd embodiment of the invention. Parts identical with those previously described with reference to FIG. 2 are denoted by the same reference numerals in FIG. 4 and will not be discussed again in detail.

In FIG. 4, if the length of subordinate magnetic circuit 14 portion of E-shaped magnetic substance 11, 12 is made short from the dashed line to the solid line, a gap 15 is enlarged and the magnetic resistance of the subordinate magnetic circuit 14 is increased; consequently, the coupling coefficient of a primary winding 1 and a secondary winding 2 is enlarged.

Thus, the leg length (namely, gap) of the subordinate magnetic circuit is increased or decreased, whereby it is made possible to adjust the coupling coefficient.

The 2nd and 3rd embodiments can be combined for adjusting the coupling coefficient based on the characteristics of both the embodiments, needless to say.

(4th Embodiment)

Figure 5:
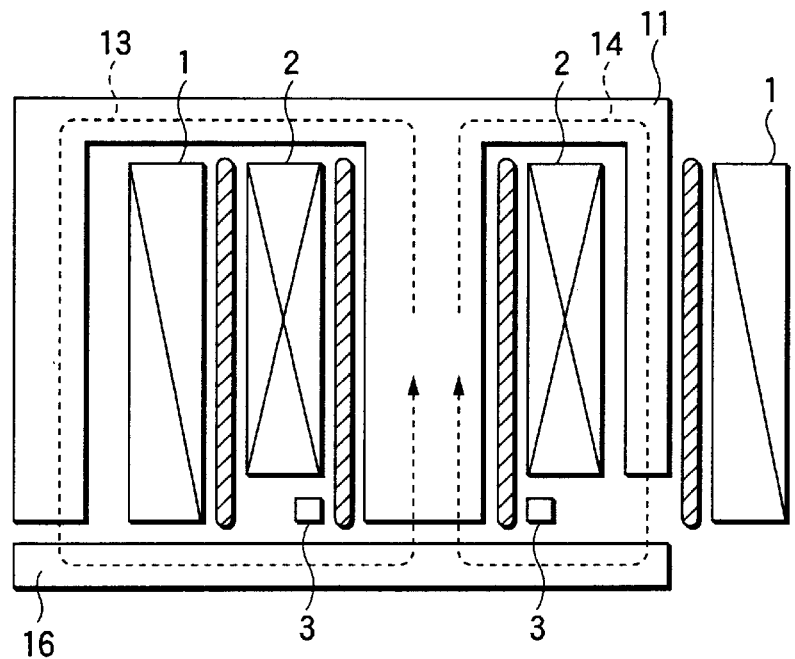
FIG. 5 is a schematic representation of a step-up transformer in a 4th embodiment of the invention.

FIG. 5 is a schematic representation of a step-up transformer in a 4th embodiment of the invention.

In FIG. 5, a step-up transformer 8 consists of a primary winding 1, a secondary winding 2, a heater winding 3, an E-shaped magnetic substance 11, and an I-shaped magnetic substance 16, and the primary winding 1 and the secondary winding 2 are wound as concentric layers with respect to a main magnetic circuit 13.

A subordinate magnetic circuit 14 exists between the primary winding 1 and the secondary winding 2. As in the 2nd and 3rd embodiments, either or both of the area and the length of the leg portion of the magnetic substance of the subordinate magnetic circuit 14 are increased or decreased at the coupling point with the I-shaped magnetic substance portion, whereby it is made possible to adjust the coupling coefficient.

Thus, various magnetic substances are combined arbitrarily, whereby the coupling coefficient can be adjusted easily.

(5th Embodiment)

Figure 7:
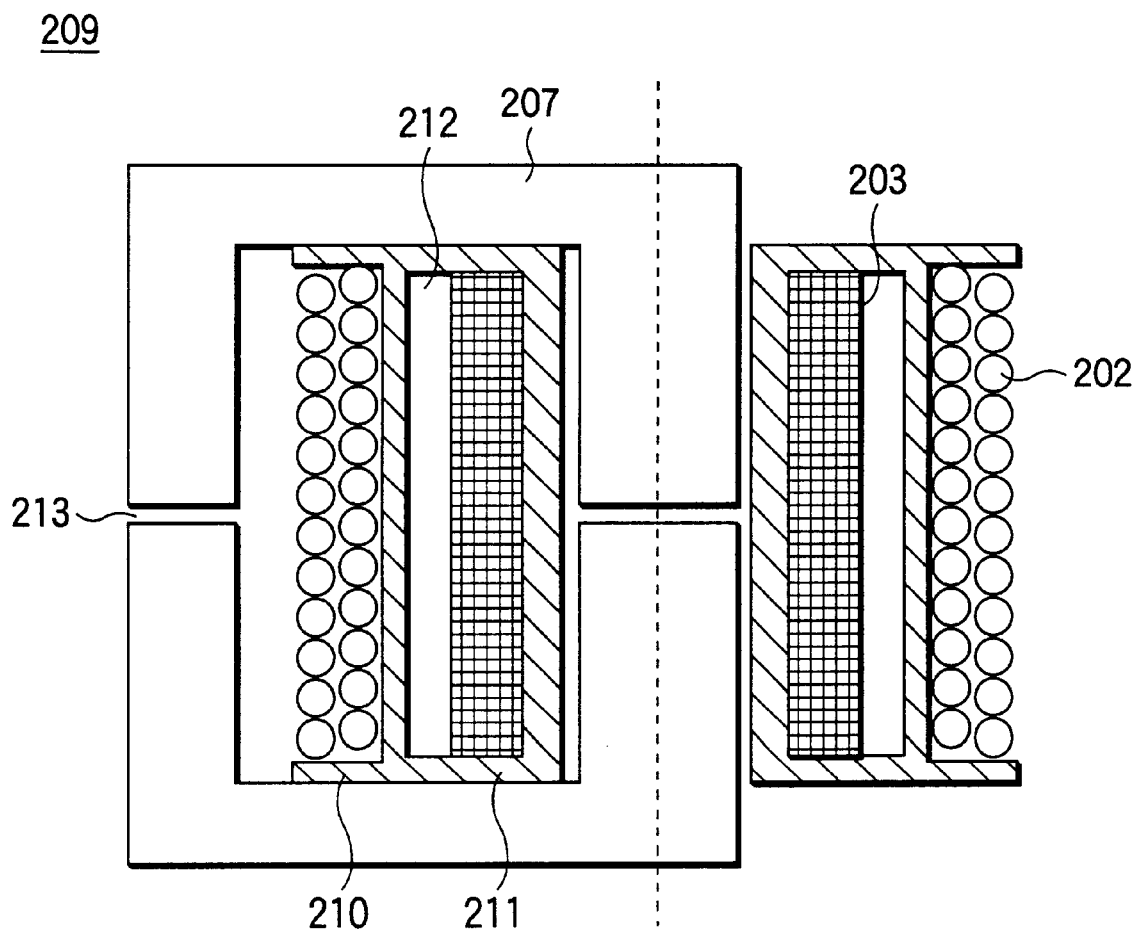
FIG. 7 is a sectional view to show an example of a transformer of a magnetron drive power supply in one embodiment of the invention.

A 5th embodiment of the invention will be discussed with reference to the accompanying drawings. FIG. 7 is a sectional view of a transformer of a magnetron drive power supply from one side thereof to show a 5th embodiment of the invention. A transformer 209 comprises an outer bobbin 210 around which a primary winding 202 is wound and an inner bobbin 211 around which a secondary winding 203 is wound, and the inner bobbin 211 is slid into the inner diameter of the outer bobbin 210 as a concentric winding structure. With the inner bobbin 211 inserted into the outer bobbin 210, the outer bobbin 210 insulates the primary winding 202 and the secondary winding 203. Further, the secondary winding 203 is not fully wound around the bobbin to the bobbin thereof, whereby a space insulation layer 212 is formed. Further, to make the inverter operation correct, two cores 207 are inserted into the inner diameter of the inner bobbin 211 with a gap 213.

According to the configuration, the primary winding 202 which a high-frequency large current flows into and generates large heat has an enlarged area exposed to the outside atmosphere and wind of a cooling fan of cooling means takes away heat generated from the whole surface, drastically improving the cooling effect. On the other hand, because of step-up transformer, the secondary winding 203 has a larger number of turns than the primary winding 202, but generates less heat than the primary winding 202, so that a large temperature rise does not occurs although the secondary winding 203 is housed in the outer bobbin 210 in a hermetical seal state and is not exposed to cooling wind. Moreover, the space insulation layer 212 can demonstrate a thermal insulation effect for circumventing a condition in which the heat of the primary winding interferes with the secondary winding for abnormally raising the temperature.

Further, for a short circuit of PS caused by an electrical breakdown, the most fatal factor to the step-up transformer of a microwave oven for generating a high voltage on the secondary winding, a double insulation structure of the resin thickness of the winding face bottom of the outer bobbin 210 and the space insulation layer 212 is provided and thus reliability is largely enhanced. In this connection, the primary winding 202 uses a Litz wire for preventing an increase in a copper loss peculiar to high frequency such as skin effect or proximity effect caused by a high-frequency large current. Generally, an easy Litz wire winding of a single wire or several wires twisted is used as the secondary winding.

Figure 8:
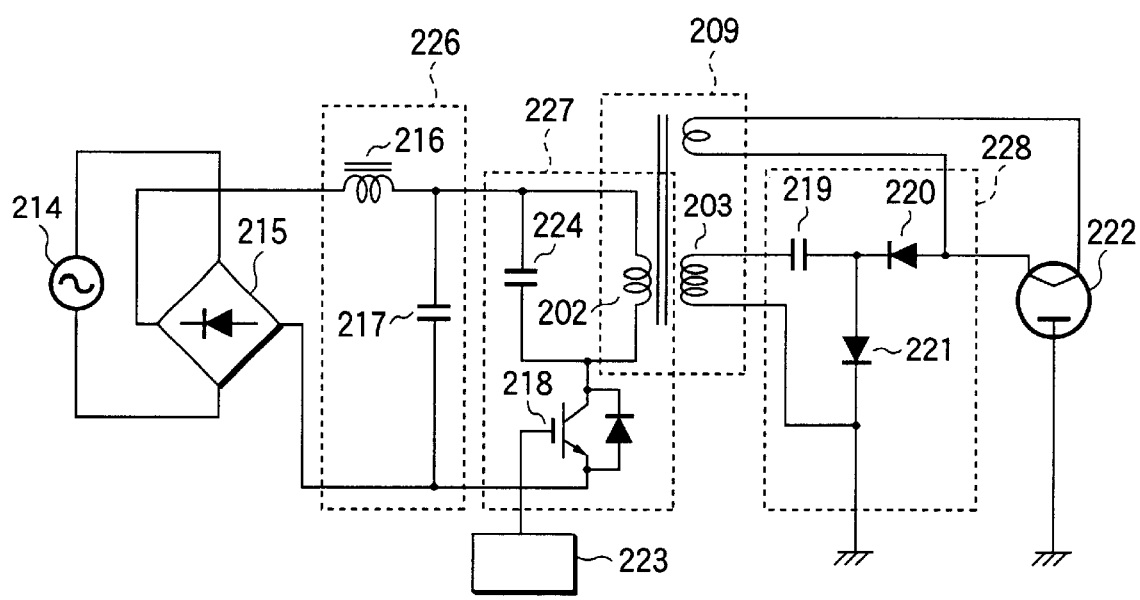
FIG. 8 is a circuit diagram of the main part of the magnetron drive power supply.

A magnetic leakage type transformer with a gap in a core is used as the step-up transformer of a microwave oven. The reason is as follows:

The operation of a magnetron drive power supply using an inverter will be briefly discussed with reference to FIG. 8. A full-wave rectifier stack 215 (unilateral power supply section) converts a commercial power supply 214 into a unilateral power supply. A rectifier filter section 226 for rectifying and smoothing the unilateral power supply comprises choke coil 216 and a smoothing capacitor 217. DC voltage provided by the rectifier filter section 226 is converted into high-frequency power by an inverter section 217.

DC voltage is applied to the primary side of step-up transformer 209 as a semiconductor switching element 218 is turned on. Meanwhile an electric current flows into leakage inductance and exciting inductance and energy is accumulated. Generally, an insulated gate bipolar transistor (IGBT) is used as the semiconductor switching element 218.

If the semiconductor switching element 218 is turned off after one time, resonance occurs in a tank circuit of a resonance capacitor 224 and inductance component and a resonance voltage occurs on the primary side of the transformer. AC voltage is applied to the step-up transformer 209 according to the on and off cycle. A switching control circuit 222 sends an on/off signal to the semiconductor switching element 218.

The on and off cycle is speeded up, whereby a high-frequency AC voltage is applied to the primary side of the step-up transformer 209. The commercial power supply is thus converted into high-frequency power supply. A high-voltage circuit 228 implemented as a half-wave voltage doubler circuit consisting of a capacitor 219 and diodes 220 and 221 converts secondary high-frequency high voltage into a high DC voltage and applies the voltage to a magnetron 222. The operation of the half-wave voltage doubler circuit is known and therefore the detailed operation principle will not be discussed. A cathode of the magnetron 222 becomes a high temperature because of power supplied from the heater winding 205 and electrons are excited, generating a microwave.

Figure 9A:
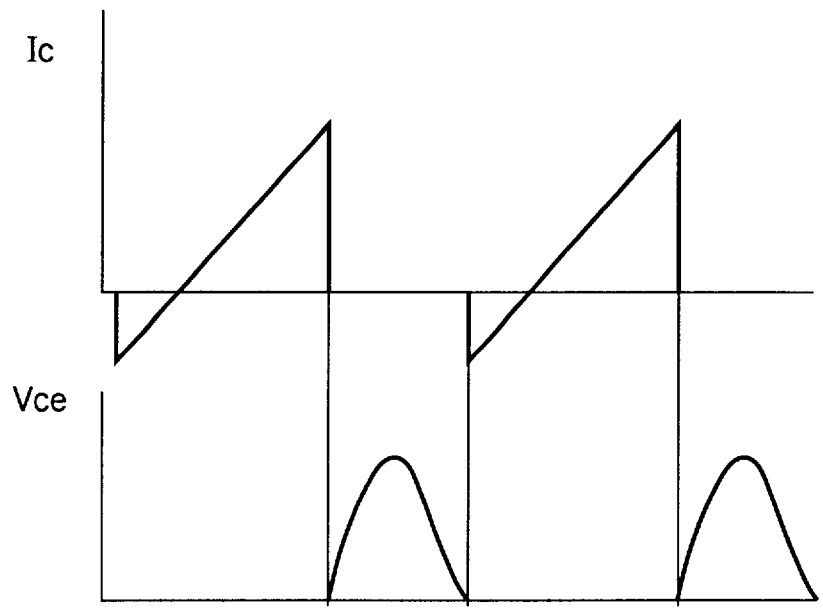
FIG. 9A is a waveform chart of generation voltage and current of a semiconductor switching element when a leakage flux is large.
Figure 9B:
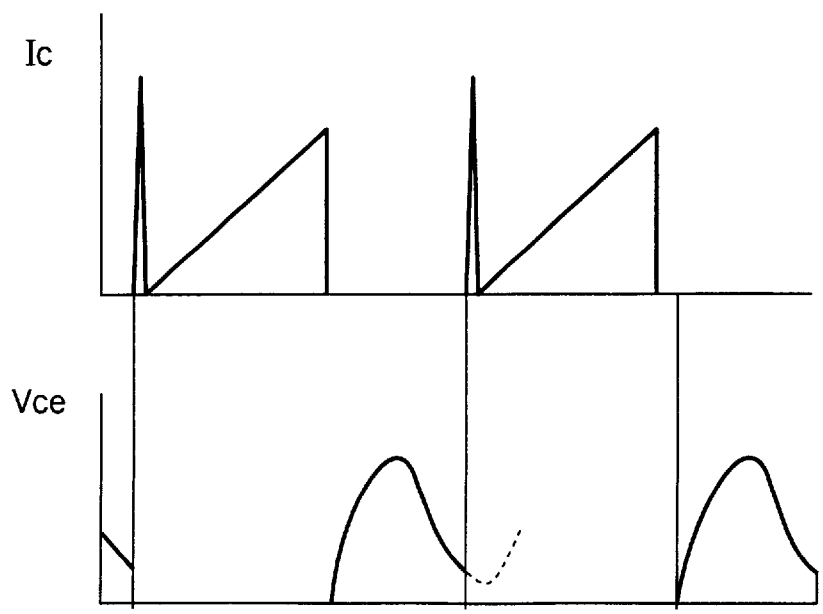
FIG. 9B is a waveform chart of generation voltage and current of the semiconductor switching element when a leakage flux is small.

A leakage flux is provided in the gap 213 of the core, whereby the operation of the inverter changes. FIGS. 9A and 9B are drawings to show the waveforms of collector-emitter voltage Vce of the semiconductor switching element 218 and current Ic. FIG. 9A shows a state in which leakage inductance is large with the gap 213 provided in the core. When current flows into the negative side of Ic, current flows into a fly wheel diode (FWD) placed with IGBT; when current flows into the positive side of Ic, current flows into the IGBT. Here, when the IGBT is on, the current grows like a ramp waveform and when the IGBT is turned off at one time, a resonance mode is entered. When resonance voltage swings to the negative side, again current flows into the FWD. If the IGBT is turned on meanwhile, zero-voltage switching can be accomplished and an excessive load is not placed on the IGBT.

FIG. 9B shows a state in which leakage inductance is small. At this time, excitation of resonance circuit is damped, Vce does not fall below zero voltage, and the excitation makes a transition to a rise mode as indicated by the dotted line. If the IGBT is turned on at this time, it is turned on in a state in which the Vce voltage remains, so that hard switching occurs, an excessive current flows, the load on the IGBT grows, and an exothermic breakdown may occur in some cases.

From such a viewpoint, a phenomenon leading to such hard switching occurs if the leakage inductance is not proper. In the invention, since the secondary winding is placed below the primary winding, direct transmission of magnetic energy between the windings is much and close coupling occurs and the state shown in FIG. 9B is easily entered. However, the space insulation layer is provided between the primary and secondary windings for physically separating the windings, whereby the state is brought close to a coarse coupling state and the state in FIG. 9A is entered and the excessive load on the IGBT caused by hard switching does not occur.

(6th Embodiment)

Figure 6:
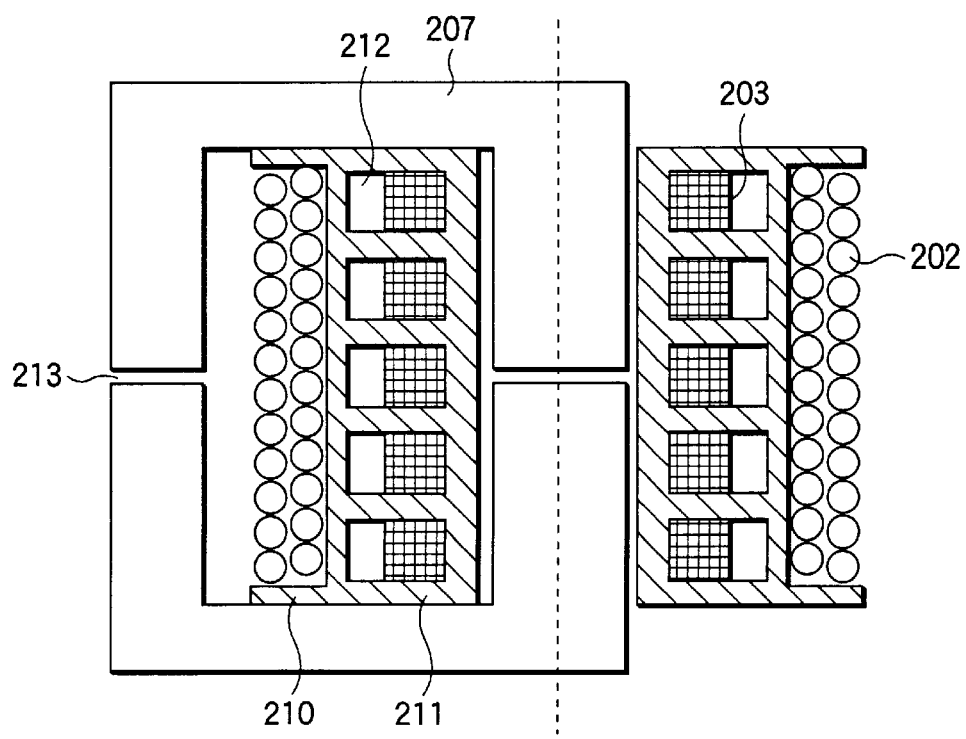
FIG. 6 is a sectional view to show an example of a transformer of a magnetron drive power supply in the invention, wherein 202 is a primary winding, 203 is a secondary winding, and 212 is a space insulation layer.

A 6th embodiment of the invention will be discussed with reference to the accompanying drawings. FIG. 6 shows a transformer of a magnetron drive power supply of the invention. An inner bobbin 211 around which a secondary winding 203 is wound is divided into four parts; if winding starts at one end, winding ends at another end. In this case, the divisions around which the secondary winding 203 is wound are insulated with resin and thus the risk of producing an electrical breakdown between the parts of the secondary winding 203 can be excluded. Since the secondary winding 203 consists of the winding divisions, heat generated by a copper loss on the secondary winding 203 is dispersed into winding grooves and is radiated, so that an excellent radiation characteristic, namely, an advantage of suppressing a temperature rise can be provided.

A space insulation layer 212 is provided. Thus, if aligned winding is not accomplished in each winding groove and partial winding disorder occurs, the division grooves around which the secondary winding 203 is wound are insulated with resin and thus the risk of producing an electrical breakdown between the parts of the secondary winding 203 can be excluded, of course, and in addition, the space insulation layer 212 can demonstrate a thermal insulation effect for circumventing a condition in which the heat of a primary winding 202 interferes with the secondary winding 203 for abnormally raising the temperature. Further, for a short circuit of PS caused by an electrical breakdown, the most fatal factor to the step-up transformer of a microwave oven for generating a high voltage on the secondary winding, a double insulation structure of the resin thickness of the winding face bottom of an outer bobbin 210 and the space insulation layer 212 is provided and thus reliability is largely enhanced.

(7th Embodiment)

Figure 10:
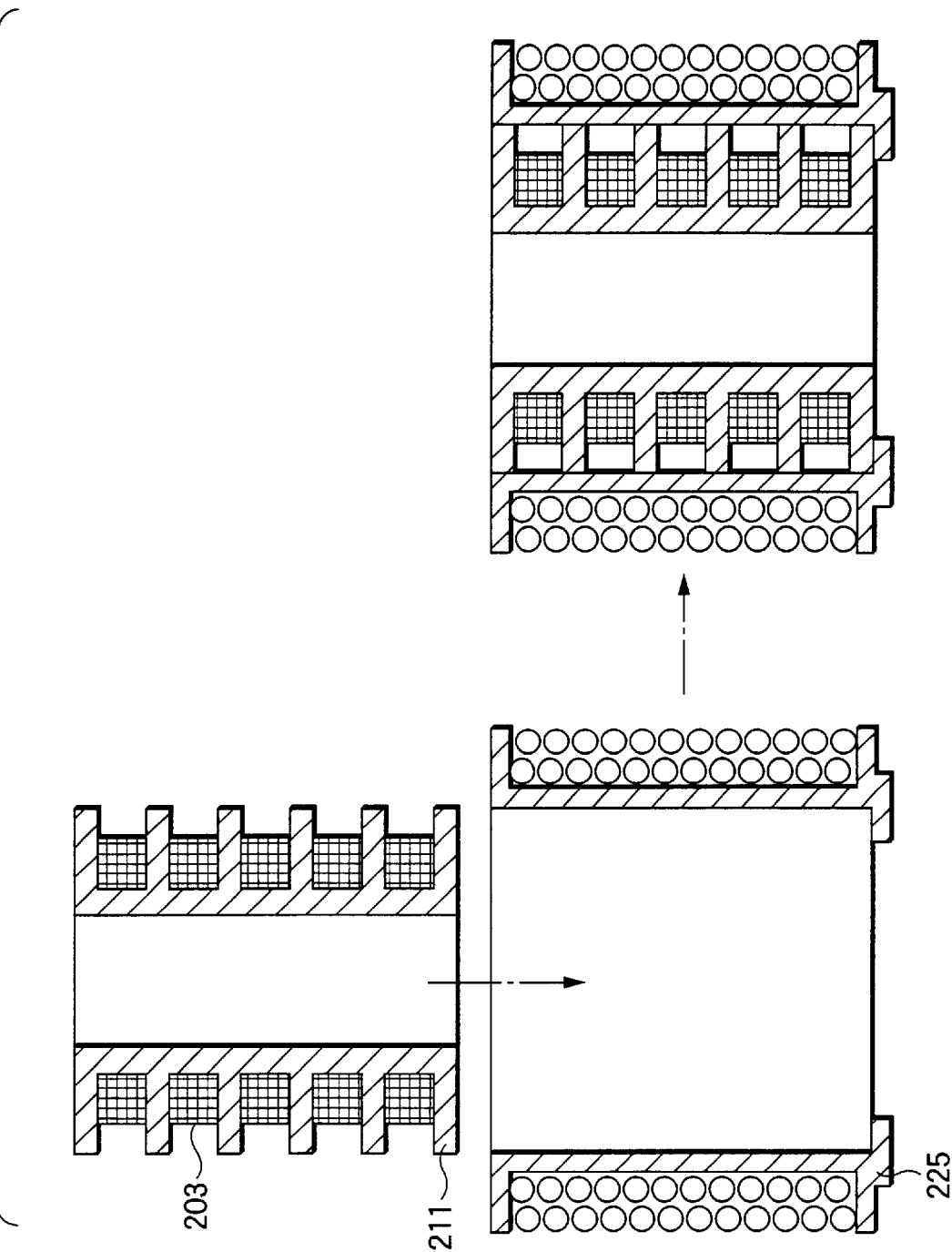
FIG. 10 is a schematic representation to show a manufacturing method of a transformer of the invention.

A 7th embodiment of the invention will be discussed with reference to the accompanying drawing. In FIG. 10, an outer bobbin 210 around which a primary winding is wound and an inner bobbin 211 around which a secondary winding is wound are provided as separate pieces and it is slid and inserted into the inner diameter of the outer bobbin. Numeral 225 denotes an insertion stopper, whereby temporary fixing at the insertion stage of the inner bobbin 211 and the outer bobbin 210 is enabled, and degrading of workability such that the bobbin is detached at the later insertion time of a core 207 does not occur. Thus, the parts can be manufactured separately and docked, winding around the inner bobbin and winding around the outer bobbin can be handled at the same time, and the manufacturing time can be shortened. By fitting and inserting, the relative positional relationship between the primary and secondary windings can be determined with accuracy according to the simple structure, and variations in the electrical characteristics of the transformer are lessened.

Figure 11:
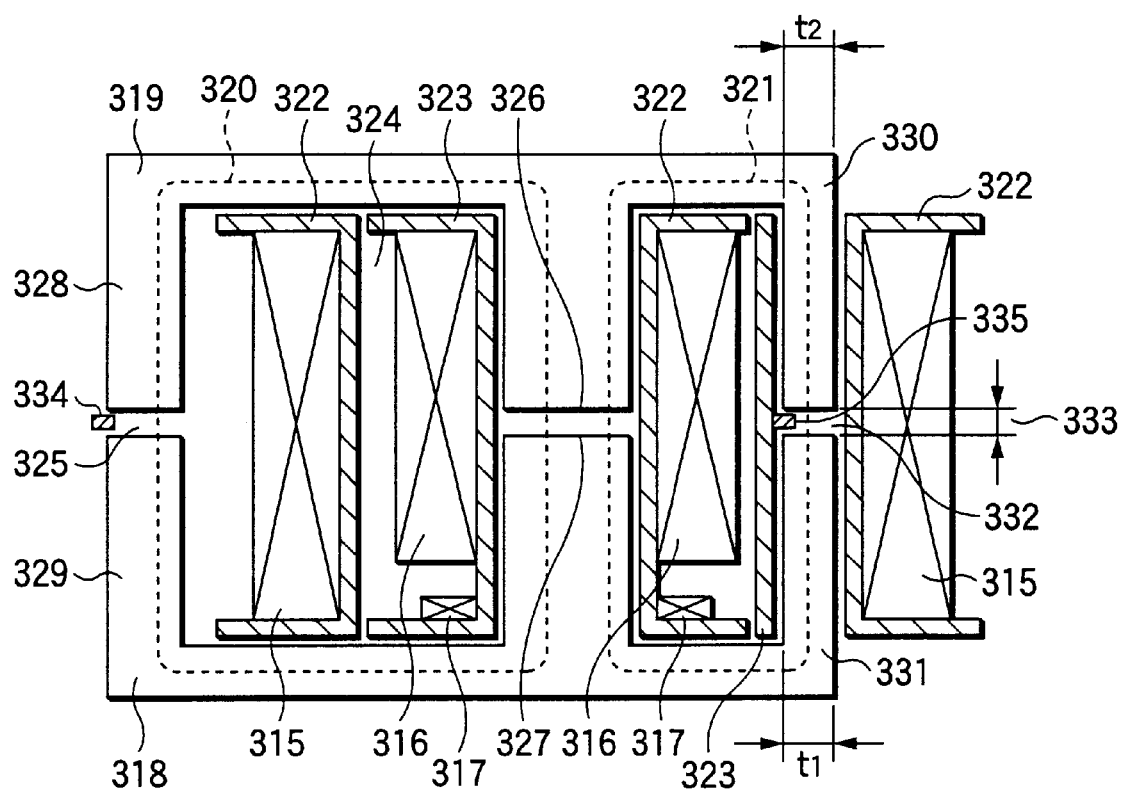
FIG. 11 is a sectional view to show a magnetron drive step-up transformer of an 8th embodiment of the invention, wherein 315 is a primary winding, 316 is a secondary winding, 318 and 319 are E-shaped magnetic substances, 320 is a main magnetic circuit, 321 is a subordinate magnetic circuit, 322 is an outer bobbin, 324 is space, 328 and 329 each is one end of E-shaped magnetic substance, 330 and 331 each is an opposite end of E-shaped magnetic substance, and 333 is a gap.

FIG. 11 is a sectional view to show a magnetron drive step-up transformer of an 8th embodiment of the invention.

Figure 12:
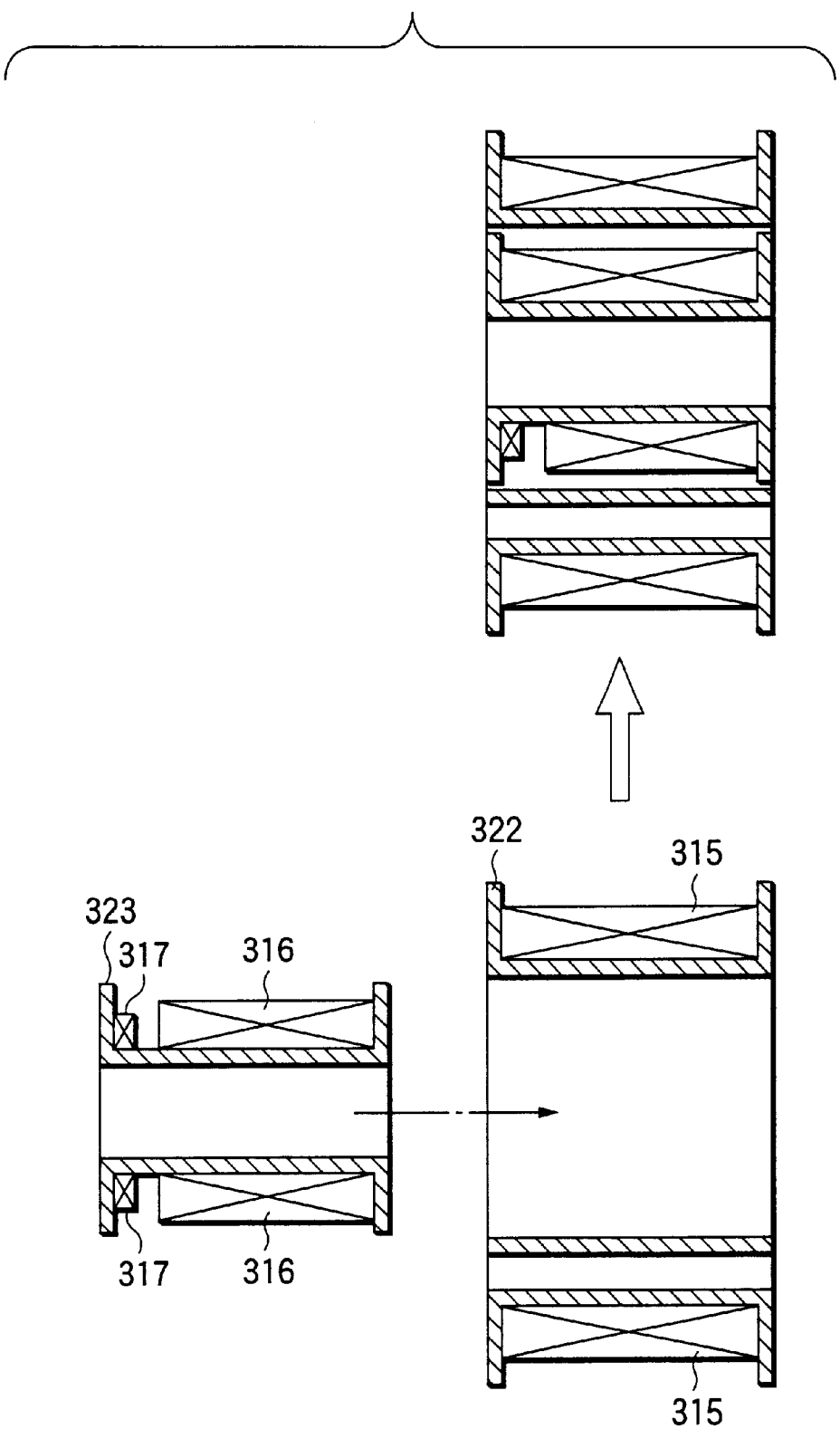
FIG. 12 is a schematic representation to show a manufacturing method of the transformer of the invention.

FIG. 1 is a diagram to show the configuration of a magnetron drive power supply using the step-up transformer. FIG. 12 is a schematic representation to show a manufacturing method of the transformer of the invention.

In FIG. 1, a magnetron drive power supply has a magnetron 6, a voltage doubler rectifier circuit 7, a step-up transformer 8 for supplying stepped-up voltage to the magnetron 6, a switching circuit 9 connected to the primary side of the step-up transformer 8, and a DC power supply circuit 10.

In FIG. 11, the step-up transformer 8 consists of a primary winding 315, a secondary winding 316, a heater winding 317, and E-shaped magnetic substances 318 and 319, and the primary winding 315 and the secondary winding 316 are wound as concentric layers with respect to a main magnetic circuit 320. A subordinate magnetic circuit 321 exists between the primary winding 315 and the secondary winding 316. Considering power transfer from the primary side to the secondary side, an attempt is made to transfer power from the primary winding 315 to the secondary winding 316 in the main magnetic circuit 320 and the subordinate magnetic circuit 321, but power is not transferred to the secondary winding 316 in the subordinate magnetic circuit 321, and a leakage flux is produced. Thus, magnetic resistance of the subordinate magnetic circuit 321 is adjusted, whereby the coupling coefficient between the primary winding 315 and the secondary winding 316 can be set to any desired value.

The step-up transformer 8 comprises an outer bobbin 322 around which the primary winding 315 is wound and an inner bobbin 323 around which the secondary winding 316 is wound.

As in FIG. 12, the inner bobbin 323 is slid into the inner diameter of the outer bobbin 322 as a concentric winding structure. With the inner bobbin 323 inserted into the outer bobbin 322, the outer bobbin 322 insulates the primary winding 315 and the secondary winding 316. Further, the secondary winding 316 is not fully wound around the bobbin to the bobbin thereof, whereby a space 324 as an insulation layer is formed. Further, to make the inverter operation correct, center ends 326 and 327 of the E-shaped magnetic substances 318 and 319 are inserted into the inner diameter of the inner bobbin 323 with a gap 325. One ends 328 and 329 of the E-shaped magnetic substances 318 and 319 are positioned on the outside of the primary winding 315 and opposite ends 330 and 331 of the E-shaped magnetic substances 318 and 319 are between the secondary winding 315 and the outer bobbin 322 around which the primary winding 315 is wound and moreover is inserted into a hole 332 of the outer bobbin 322 for inserting the E-shaped magnetic substances 318 and 319.

Next, the dimensions of the E-shaped magnetic substances 318 and 319 related to the magnetic characteristic about the subordinate magnetic circuit 321 will be discussed as one of the factors determining the size of the magnetron drive step-up transformer of the invention. The subordinate magnetic circuit 321 is determined so that the coupling coefficient is set to about 0.7 to 0.9 from the inverter characteristic. If the thicknesses of the E-shaped magnetic substances 318 and 319 forming the subordinate magnetic circuit 321 (t1 and t2) are examined, a stable area with magnetism unsaturated can be set. If a gap 333 of the E-shaped magnetic substances 318 and 319 forming the subordinate magnetic circuit 321 is adjusted, the coupling coefficient can be adjusted to 0.7 to 0.9. Therefore, the hole 332 of the optimum dimensions of the outer bobbin 322 responsive to the thicknesses of the E-shaped magnetic substances 318 and 319 (t1 and t2) is determined and a small and compact step-up transformer can be provided.

Next, for the E-shaped magnetic substances 318 and 319 forming the subordinate magnetic circuit 321 and the main magnetic circuit 320, ferrites are attracted to each other or are detached from each other in the gap 325, 333, etc., producing a metal sound offensive to ears during the operation of the switching circuit 9. Thus, resin spacers 334 and 335 are inserted in the gaps 325 and 333 respectively. Since the resin outer bobbin 322 exists in the proximity of the resin spacer 335 existing in the subordinate magnetic circuit 321, the resin spacer 335 can be molded with the resin outer bobbin 322 in one piece. The resin spacer 335 is molded with the resin outer bobbin 322 in one piece, whereby the difficulty of attaching a small spacer to the depth of the hole 332 is excluded, and the E-shaped magnetic substances 318 and 319 are inserted from both sides of the hole 332, whereby the opposite ends 330 and 331 of the E-shaped magnetic substances 318 and 319 do not come in direct contact each other and the resin spacer 335 is placed between the opposite ends 330 and 331 of the E-shaped magnetic substances 318 and 319; workability is made better, needless to say and in addition, an abnormal sound offensive to ears is not produced.

Next, the operation and function of the magnetron drive step-up transformer will be discussed. According to the configuration, the primary winding 315 which a high-frequency large current flows into and generates large heat has an enlarged area exposed to the outside atmosphere and wind of a cooling fan of cooling means (not shown) takes away heat generated from the whole surface, drastically improving the cooling effect. On the other hand, because of step-up transformer, the secondary winding 316 has a larger number of turns than the primary winding 315, but generates less heat than the primary winding 315, so that a large temperature rise does not occurs although the secondary winding 316 is housed in the outer bobbin 322 in a hermetical seal state and is not exposed to cooling wind. Moreover, the space 324 can demonstrate a thermal insulation effect for circumventing a condition in which the heat of the primary winding 315 interferes with the secondary winding 316 for abnormally raising the temperature.

Further, for a short circuit of PS caused by an electrical breakdown, the most fatal factor to the step-up transformer of a microwave oven for generating a high voltage on the secondary winding, a double insulation structure of the resin thickness of the winding face bottom of the outer bobbin 322 and the space 324 is provided and thus reliability is largely enhanced. In this connection, the primary winding 315 uses a Litz wire for preventing an increase in a copper loss peculiar to high frequency such as skin effect or proximity effect caused by a high-frequency large current. Generally, an easy Litz wire winding of a single wire or several wires twisted is used as the secondary winding 316.

Therefore, the magnetron drive step-up transformer of the invention has the primary winding and the secondary winding concentrically with the primary winding placed outside and the secondary winding placed inside and has a predetermined space provided between the primary winding and the secondary winding, so that the primary winding which a large current flows into and generates large heat can be exposed largely to the atmosphere, thus the temperature performance (cooling performance) can be enhanced, and because of the insulation layer of the space of the air layer provided between the primary winding and the secondary winding, the temperature performance of the secondary winding can also be improved without conducting the heat on the primary side to the secondary side for raising the winding temperature.

The electric insulation of the primary winding and the secondary winding can be more enhanced by providing the space of the air layer; a still more improvement effect can also be produced on the safety.

The bobbin of the primary winding is slid, inserted, and fitted into the inner diameter of the bobbin of the secondary winding, so that the parts can be manufactured separately and docked, winding around the inner bobbin and winding around the outer bobbin can be worked at the same time, and the manufacturing time can be shortened.

By fitting and inserting, the relative positional relationship between the primary and secondary windings can be determined easily with accuracy, and variations in the electrical characteristics of the transformer are lessened.

(9th Embodiment)

Figure 13:
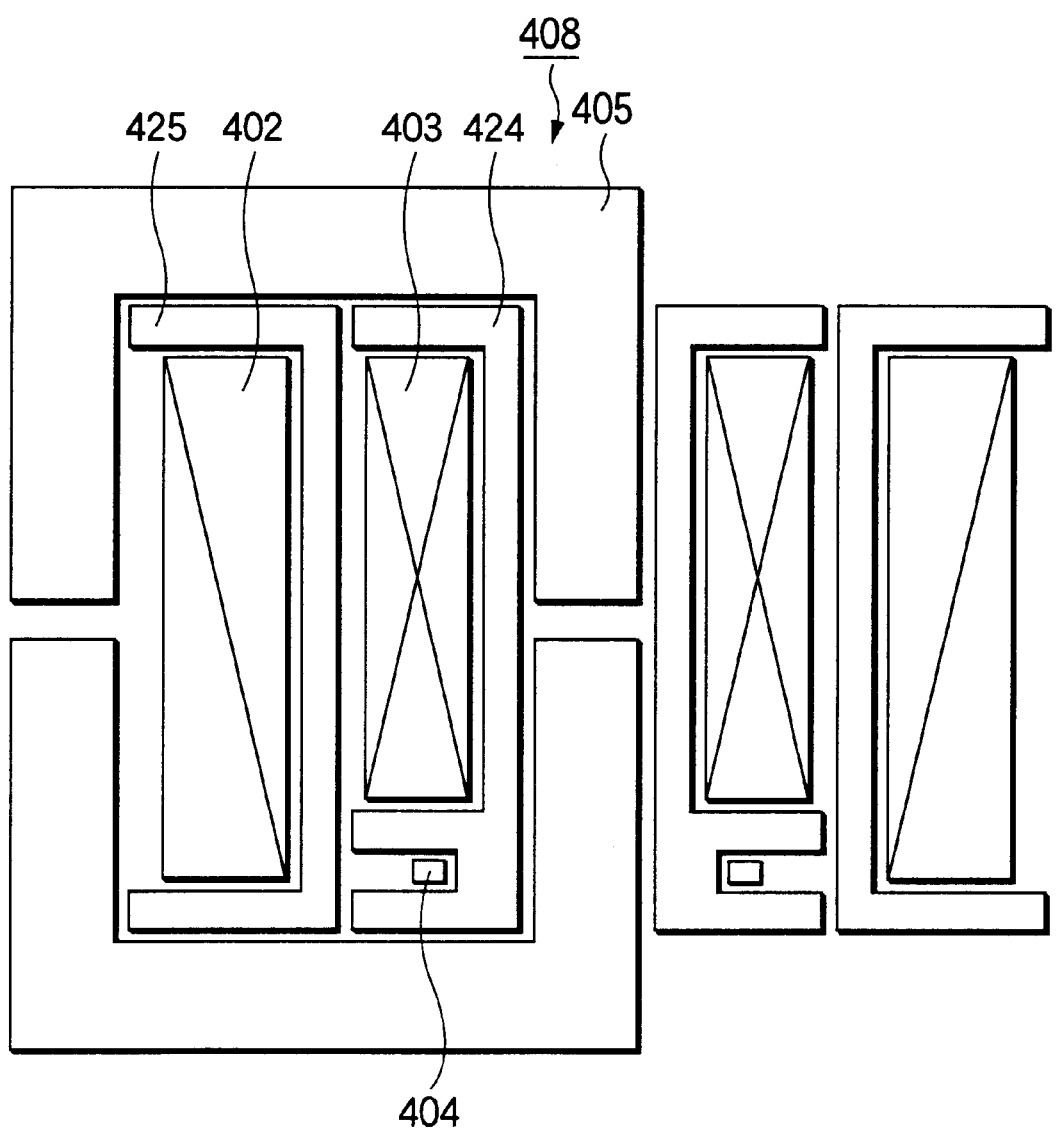
FIG. 13 is a sectional side view of a step-up transformer of a magnetron drive step-up transformer unit in a 13th embodiment of the invention, wherein 402 is a primary winding, 403 is a secondary winding, 404 is a heater winding, 405 is a core (magnetic substance), 408 is a step-up transformer, 424 is an inner bobbin, and 425 is an outer bobbin.
Figure 24:
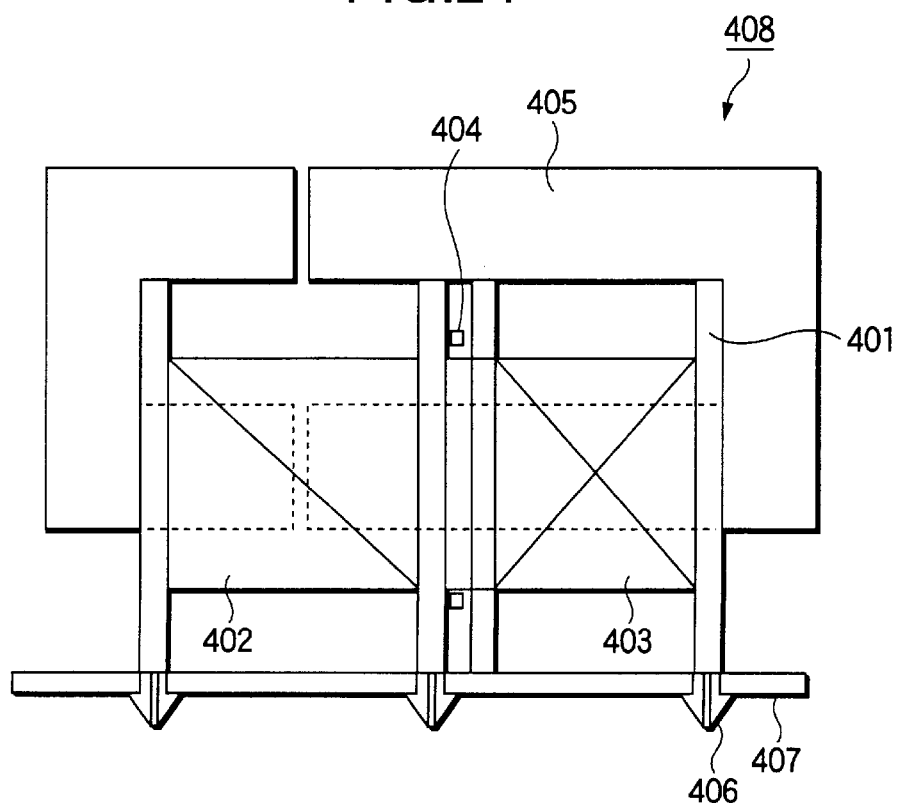
FIG. 24 is a sectional view of a step-up transformer of a magnetron drive step-up transformer unit in a related art.
Figure 25:
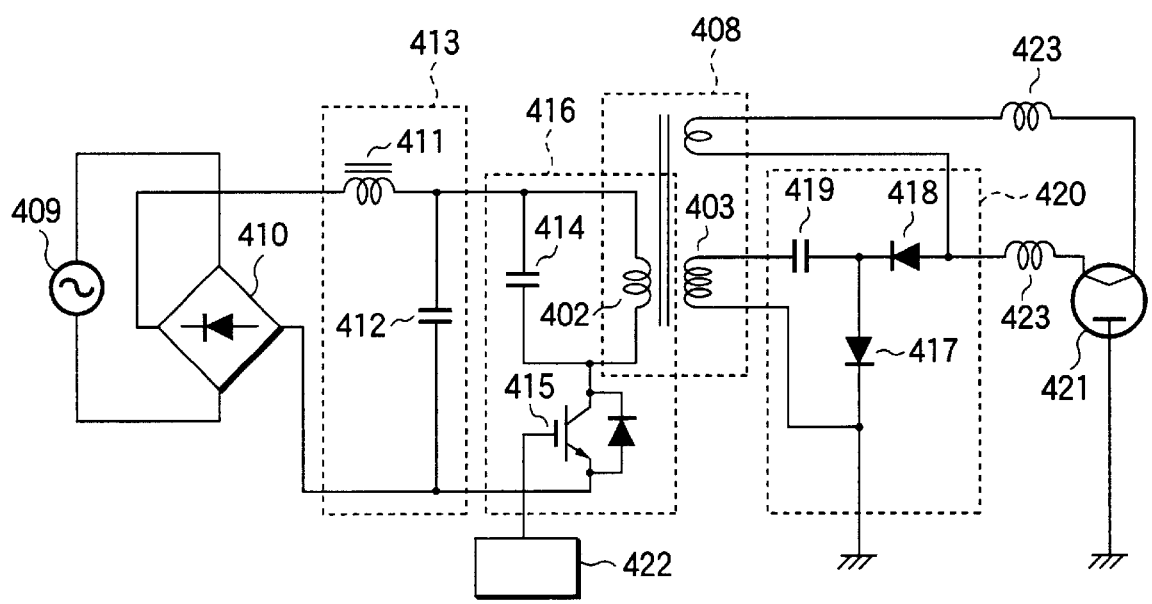
FIG. 25 is a circuit diagram of the magnetron drive step-up transformer unit in FIG. 24.
Figure 26:
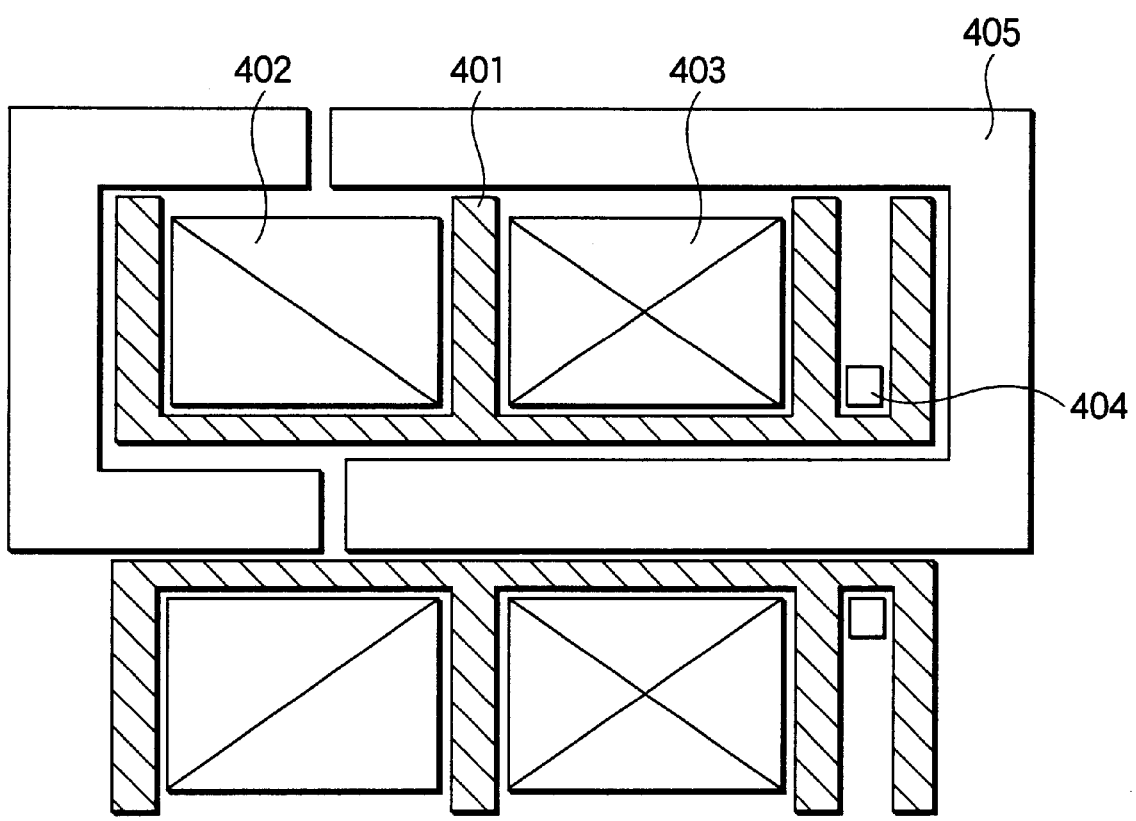
FIG. 26 is a sectional view of a step-up transformer of a magnetron drive step-up transformer unit in another related art.
Figure 27:
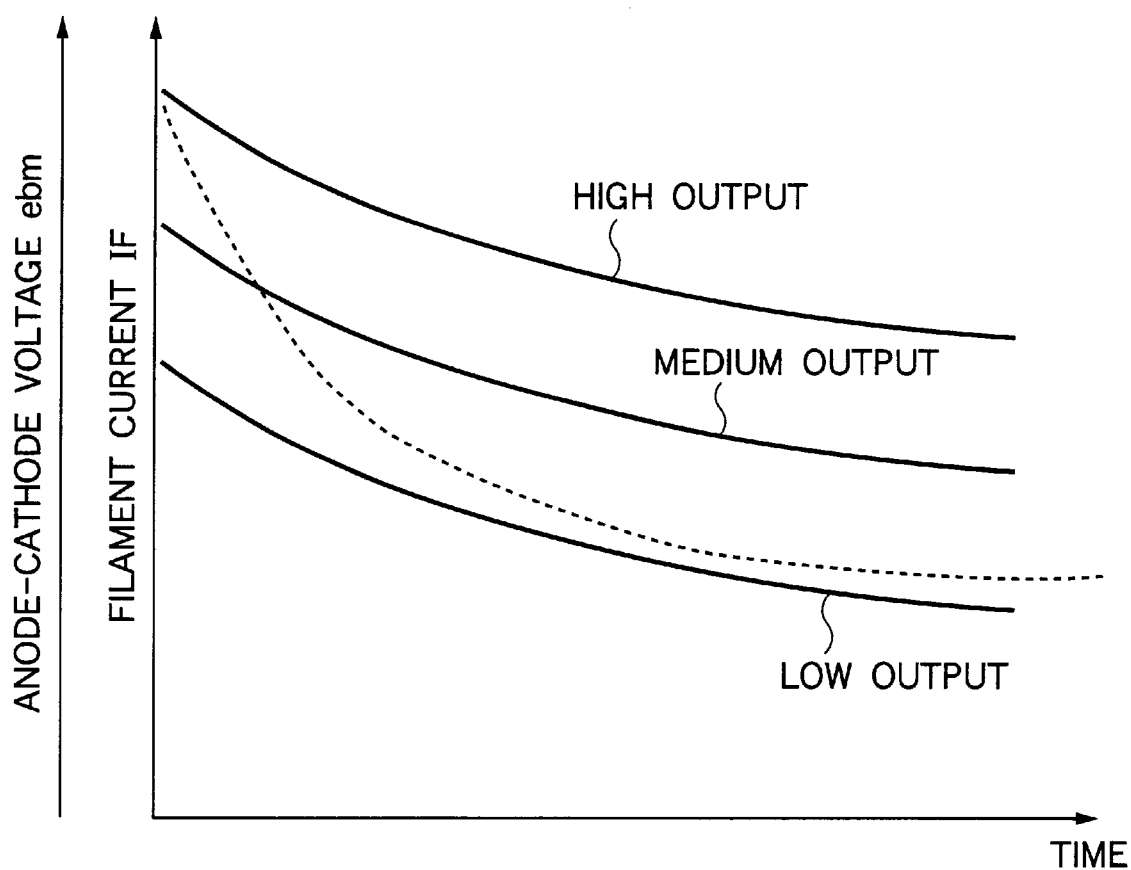
FIG. 27 is a characteristic chart to show time change of filament current and anode-cathode voltage of the magnetron drive step-up transformer unit in FIG. 13 and power control characteristic.
Figure 28:
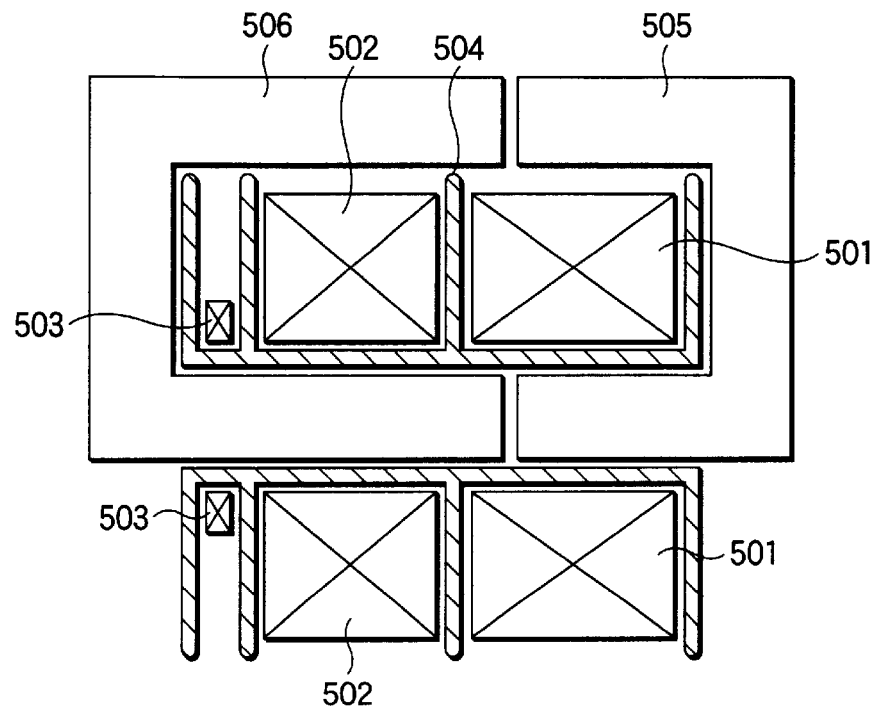
FIG. 28 is a sectional view of a magnetron drive step-up transformer unit in a related art.
Figure 29:
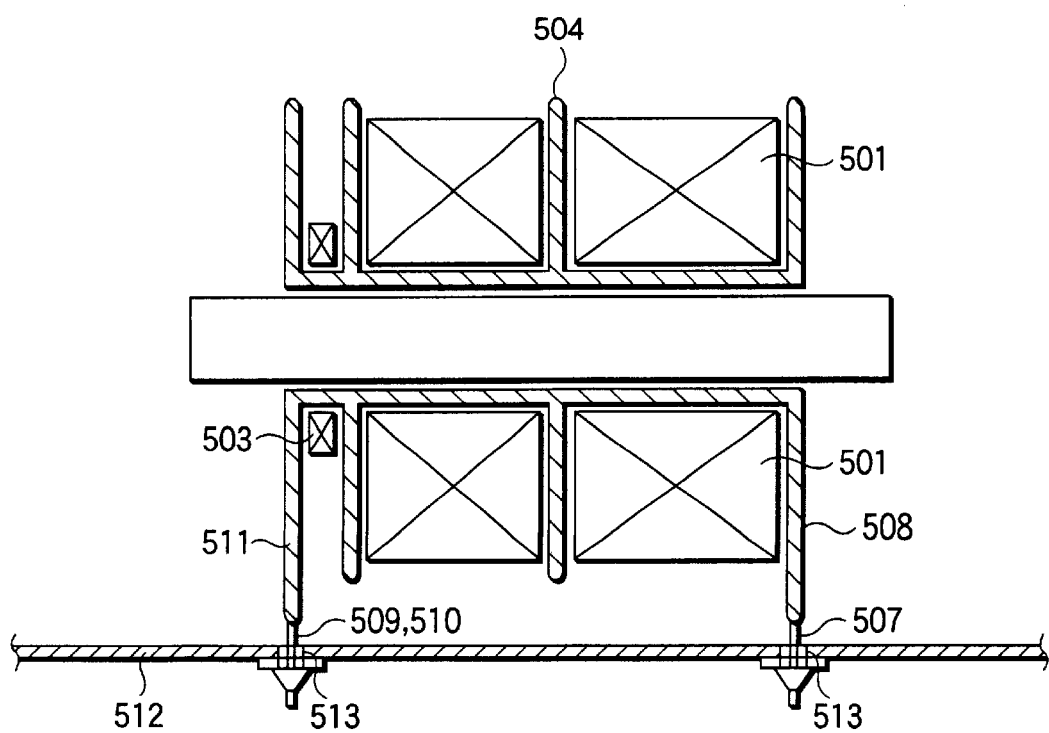
FIG. 29 is a sectional view of the magnetron drive step-up transformer unit in the related art.
Figure 30:
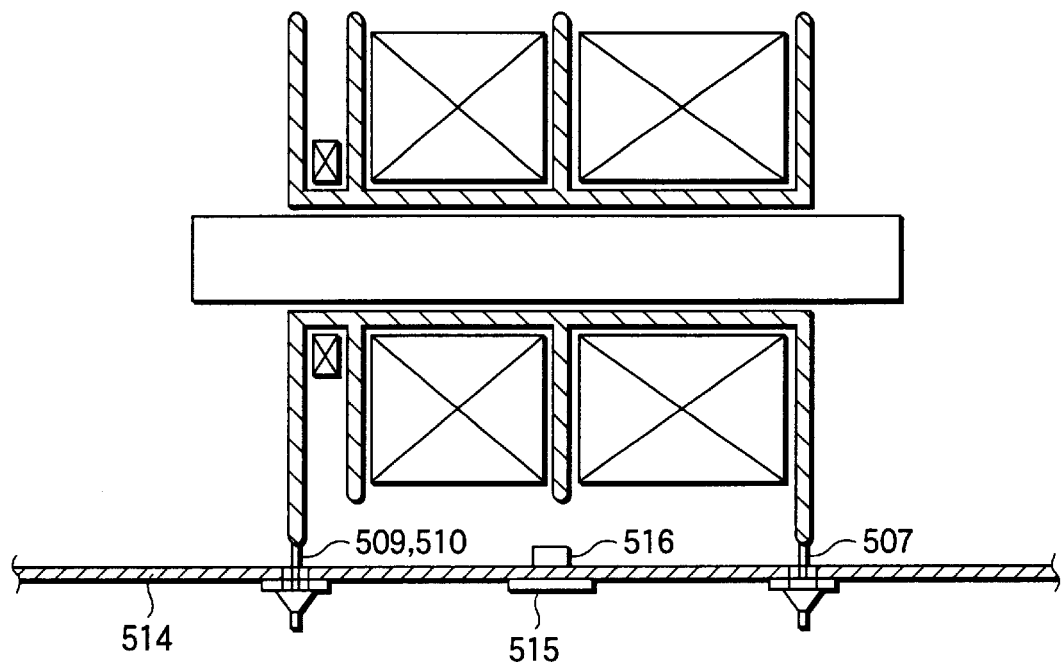
FIG. 30 is a sectional view of a magnetron drive step-up transformer unit in another related art.
Figure 31:
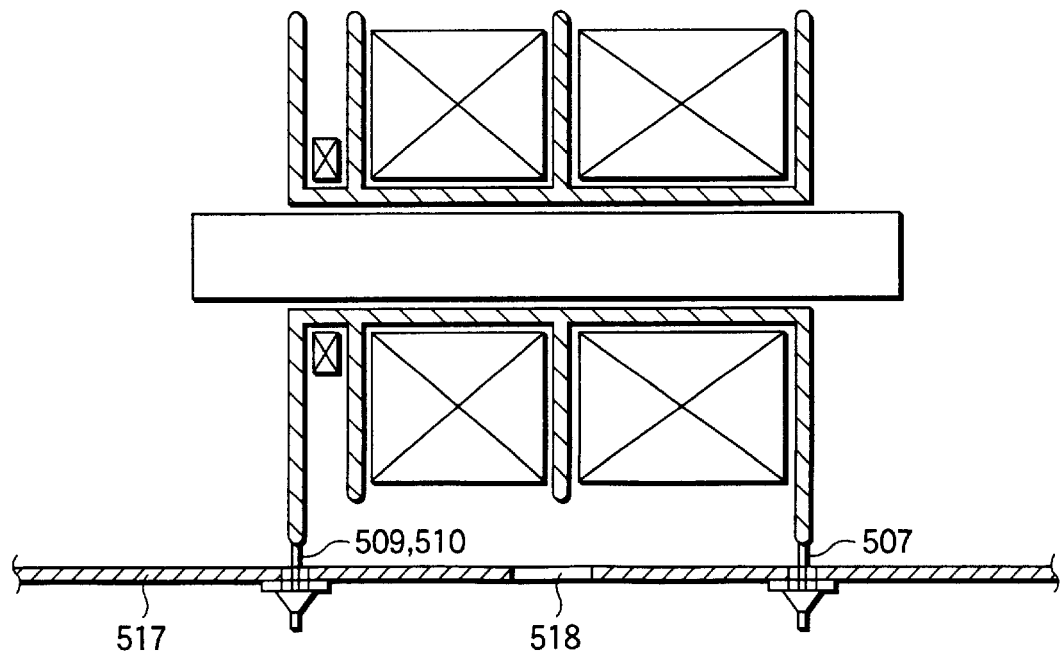
FIG. 31 is a sectional view of a magnetron drive step-up transformer unit in still another related art.

FIG. 13 is a sectional side view of a step-up transformer of a magnetron drive step-up transformer unit of a 9th embodiment of the invention from one side thereof. Parts identical with those previously described with reference to FIG. 24 are denoted by the same reference numerals in FIG. 13 and will not be discussed again in detail.

A secondary winding 403 and a heater winding 404 are wound around an inner bobbin 424, making up one piece. An outer bobbin 425 around which a primary winding 402 is wound has a diameter sized to allow the inner bobbin 424 to be slid in the inner diameter of the outer bobbin. Further, a leg of a core 405 is just slid in the inner diameter of the inner bobbin 424. The core 405 is made up of two pieces and the facing distance of the bottoms of legs of the core 405 paired is adjusted, whereby the coupling coefficient between the primary winding 402 and the secondary winding 403 of the step-up transformer wherein the inverter operation is stable can be provided. However, it is difficult to lower the coupling coefficient to 0.9 or less because of the large amount of direct transfer flux between the windings.

Figure 14:
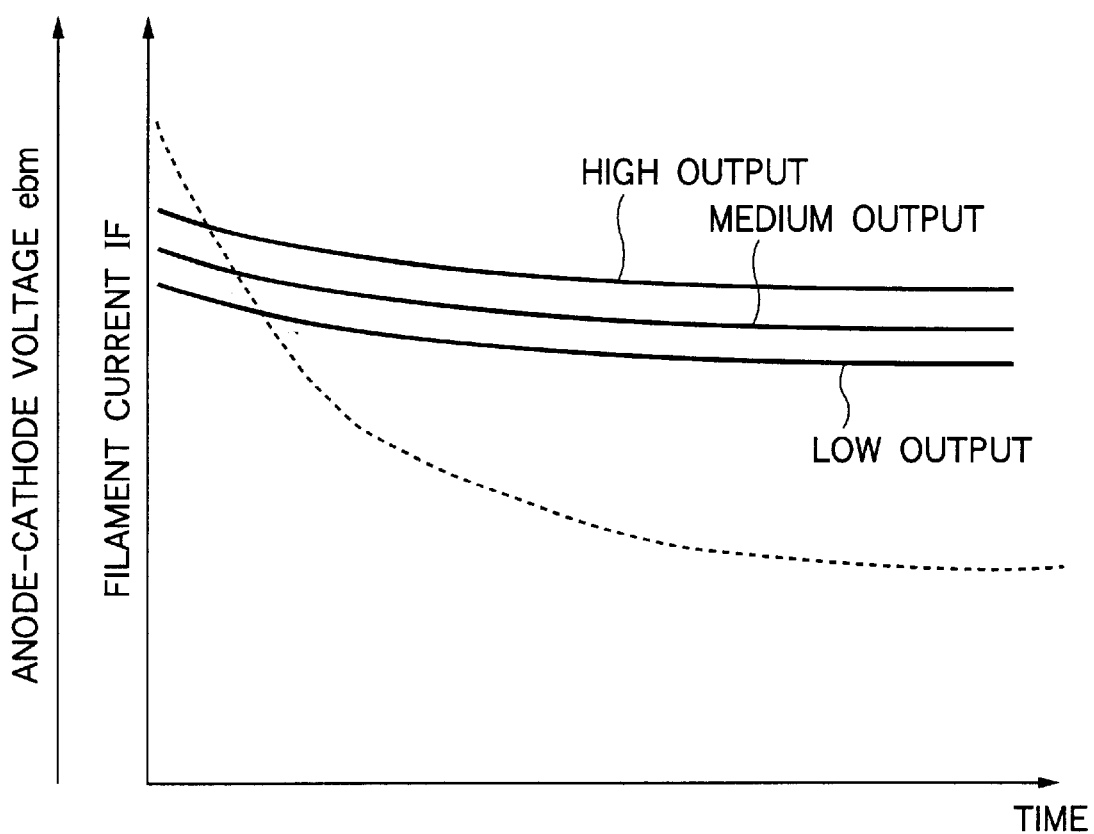
FIG. 14 is a characteristic chart to show time change of filament current and anode-cathode voltage of the magnetron drive step-up transformer unit in FIG. 13 and power control characteristic.

Such a concentric multilayer structure is adopted, whereby the coupling coefficient between the primary winding 402 and the heater winding 404 can be raised and variation in the filament current If at the power control time can be lessened like that in FIG. 14, thus the power control of a feature of the inverter can lower to low output without considering a moding phenomenon of the magnetron and foods can be heated with low output; a heat cooking menu that cannot be well finished unless output is low can be realized.

Since the primary and secondary windings of the step-up transformer 408 are wound around the bobbins of separate pieces, a short circuit of PS fatal to the step-up transformer 408 of a microwave oven is extremely hard to occur, and a highly safe microwave oven can be provided.

In the example, the secondary winding 403 and the heater winding 404 are wound around the inner bobbin 424 and the primary winding 402 is wound around the outer bobbin 425. Conversely, if the secondary winding 403 is wound around the inner bobbin 424 and the secondary winding 403 and the heater winding 404 are wound around the outer bobbin 425, an equivalent advantage can be provided. It is desired to consider the cooling performance and the emission performance of noise for selection. In the invention, the former composition is adopted.

(10th Embodiment)

Figure 15:
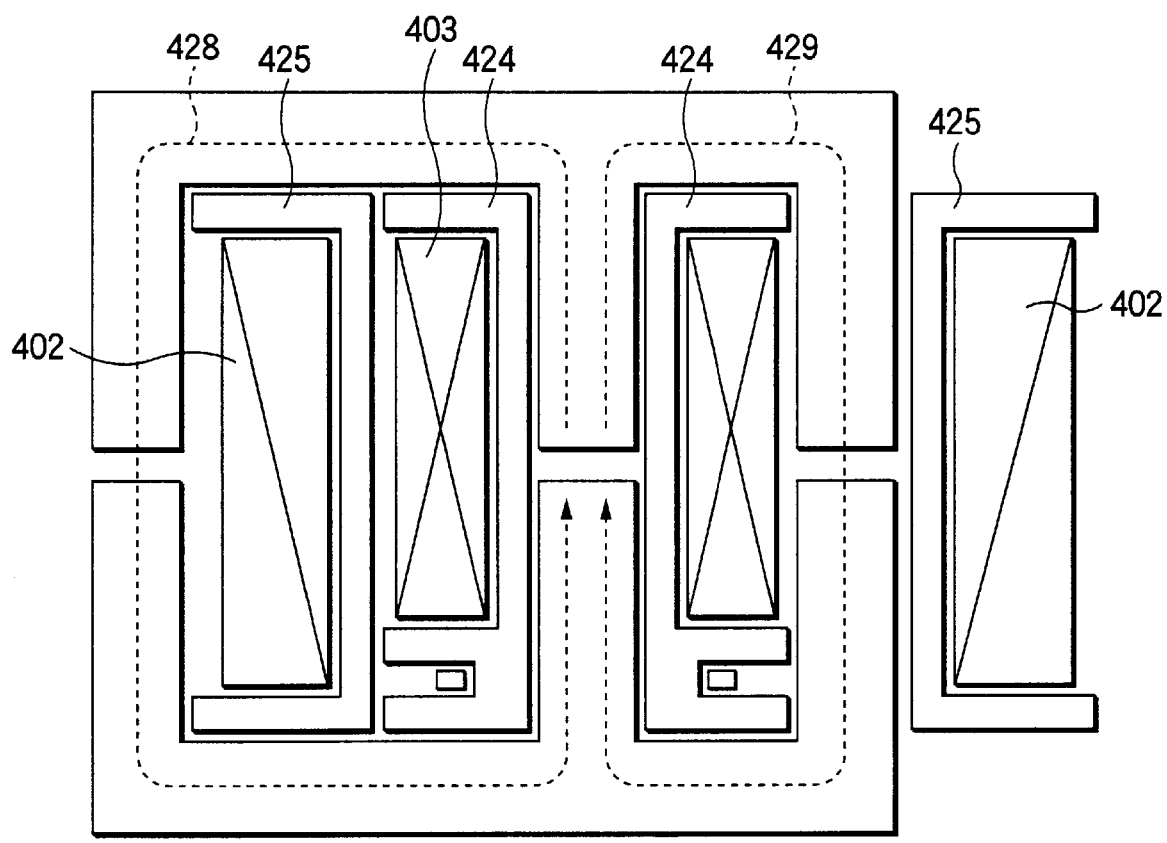
FIG. 15 is a sectional side view of a step-up transformer of a magnetron drive step-up transformer unit in a 14th embodiment of the invention, wherein 402 is a primary winding, 403 is a secondary winding, 424 is an inner bobbin, 425 is an outer bobbin, 428 is a main magnetic circuit, and 429 is a subordinate magnetic circuit.

FIG. 15 is a sectional side view of a step-up transformer of a magnetron drive step-up transformer unit of a 10th embodiment of the invention from one side thereof. Parts identical with those previously described with reference to FIGS. 24 and 13 are denoted by the same reference numerals in FIG. 15 and will not be discussed again in detail.

A magnetron drive power supply is made up of a full-wave rectifier circuit 410 and a rectification filter 413 for generating a DC power supply, an inverter section 416 of a switching circuit for converting direct current into high-frequency power, a step-up transformer 408, and a voltage doubler rectifier circuit for converting the high-frequency power into a high DC voltage.

The step-up transformer 408 consists of a primary winding 402, a secondary winding 403, a heater winding 404, and E-shaped magnetic substances (E-shaped cores) 426 and 427, and the primary winding 402, the secondary winding 403, and the heater winding 404 are wound as concentric layers with respect to a main magnetic circuit 428.

A subordinate magnetic circuit 429 exists between the primary winding 402 and the secondary winding 403.

Considering power transfer from the primary side to the secondary side, an attempt is made to transfer power from the primary winding 402 to the secondary winding 403 in the main magnetic circuit 428 and the subordinate magnetic circuit 429, but power is not transferred to the secondary winding 403 in the subordinate magnetic circuit 429, and a leakage flux is produced.

Thus, magnetic resistance of the subordinate magnetic circuit 429 is adjusted, whereby the coupling coefficient between the primary winding 402 and the secondary winding 403 can be set to any desired value. As covered in the description of the first embodiment, unless the coupling coefficient is adjusted in the subordinate magnetic circuit 429 for intensifying excitation of resonance voltage and the switching loss of the switching element 415 is reduced by stable zero-voltage switching, some inverter techniques cannot be put to use. For such a type of inverter technique, the coupling coefficient adjustment using the present technique is extremely effective.

Figure 16:
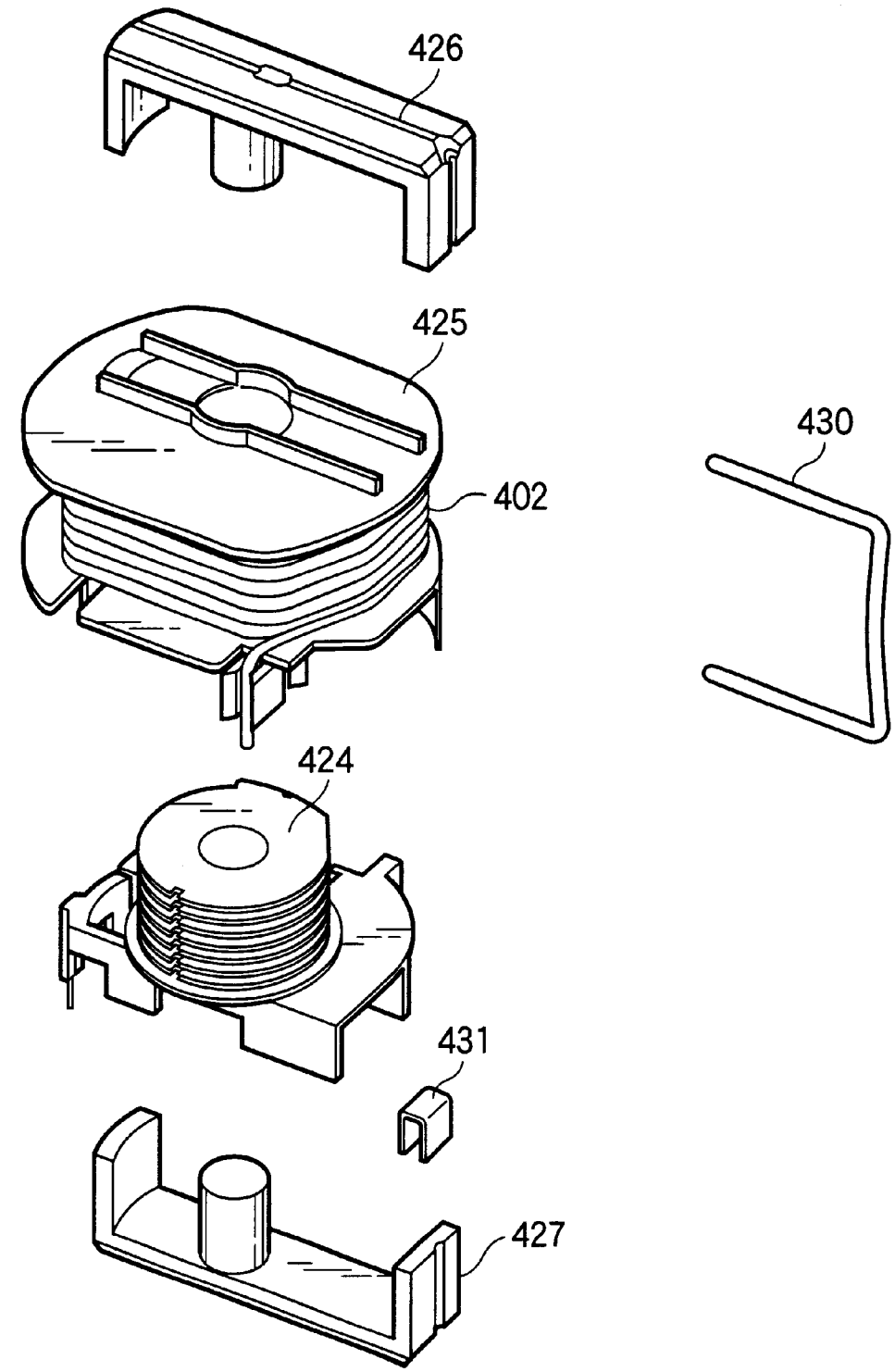
FIG. 16 is an exploded perspective view of the step-up transformer in FIG. 15.

FIG. 16 is an exploded perspective view of the step-up transformer 408 of the embodiment. An inner bobbin 424 around which the secondary winding 403 and the heater winding 404 are wound is inserted into the inner diameter of an outer bobbin 425 around which the primary winding 402 is wound. Center shafts of the E-shaped cores 426 and 427 are inserted into the inner diameter of the inner bobbin 424 from the top and bottom, a core clip 430 is inserted from the sides of both the cores, and a stress is applied to the cores from the top and bottom by an elastic force for fixing. The spacing between the E-shaped cores 426 and 427 is regulated and held by means of a core gap 431.

Figure 17A:
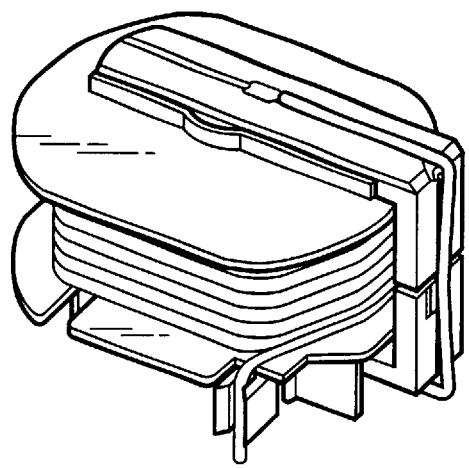
FIG. 17A is a perspective view of the appearance of the step-up transformer in FIG. 15.
Figure 17B:
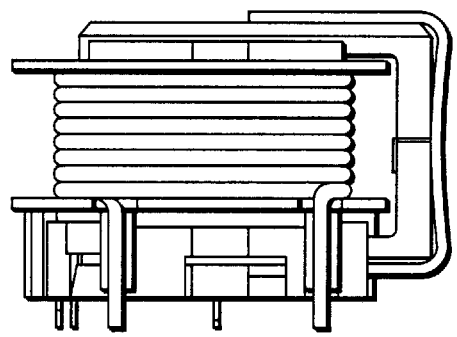
FIG. 17B is a side view of the appearance of the step-up transformer in FIG. 15.
Figure 17C:
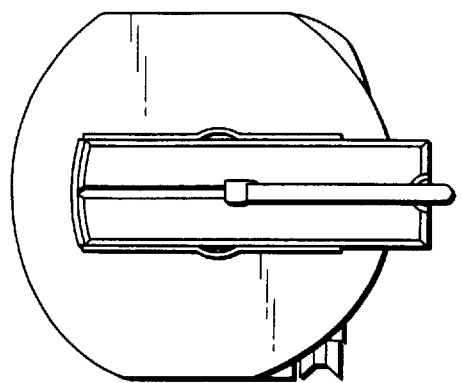
FIG. 17C is a top view of the appearance of the step-up transformer in FIG. 15.

The appearance of the step-up transformer 408 is shown in FIGS. 17A to 17C more accurately. FIG. 17A is a perspective view of the appearance of the finished product; FIG. 17B is a side view of the appearance of the finished product; and FIG. 17C is a top view of the appearance of the finished product.

(11th Embodiment)

Figure 18:
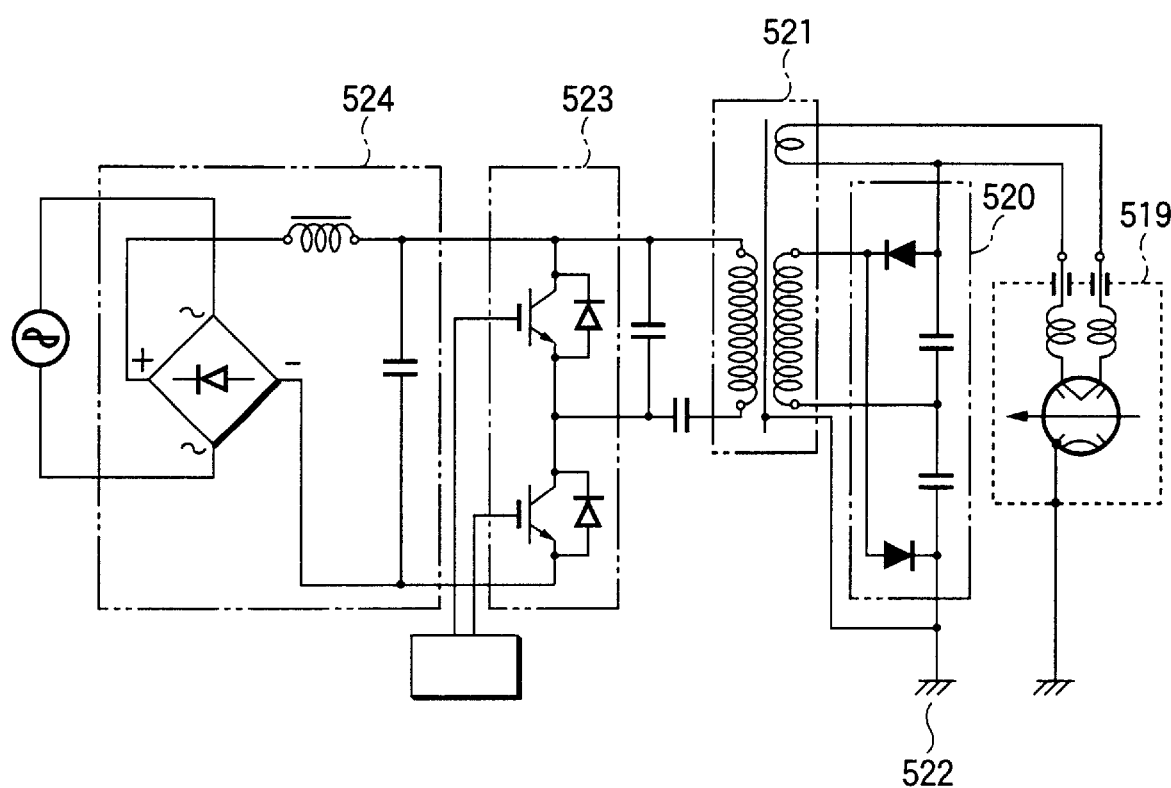
FIG. 18 is a circuit diagram of a magnetron drive step-up transformer unit in a 15th embodiment of the invention, wherein 519 is a magnetron, 520 is a high voltage doubler rectifier circuit section, 521 is a step-up transformer, 522 is a switching circuit, 523 is a chassis ground, and 524 is a DC power supply.
Figure 19:
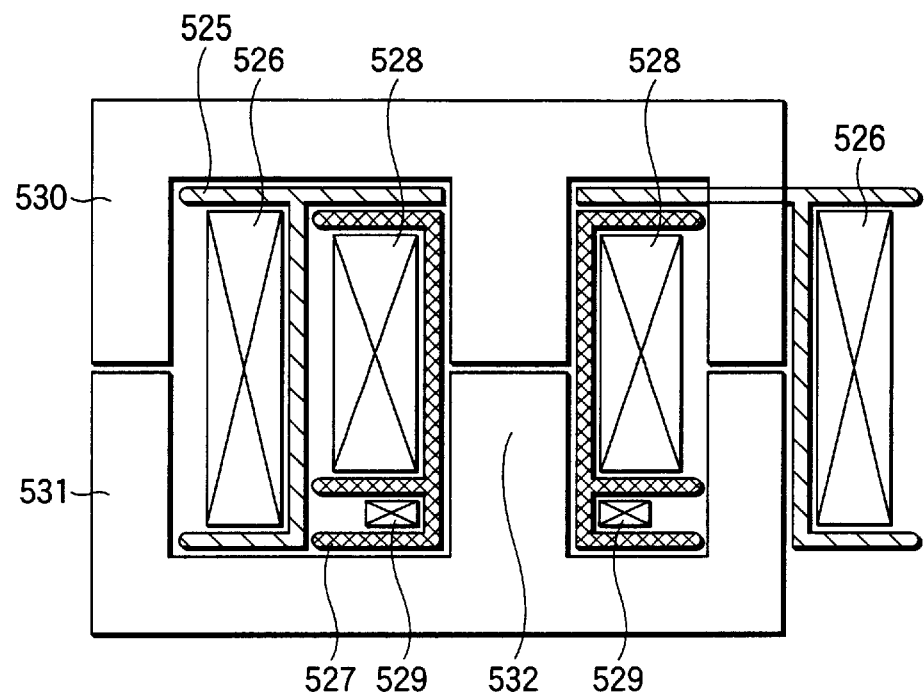
FIG. 19 is a sectional view of the step-up transformer unit in the 15th embodiment of the invention, wherein 525 is a primary bobbin, 526 is a primary winding, 527 is a secondary bobbin, 528 is a secondary winding, 529 is a heater winding, 530 and 531 each is an E-shaped magnetic substance, and 532 is a main magnetic circuit.
Figure 20:
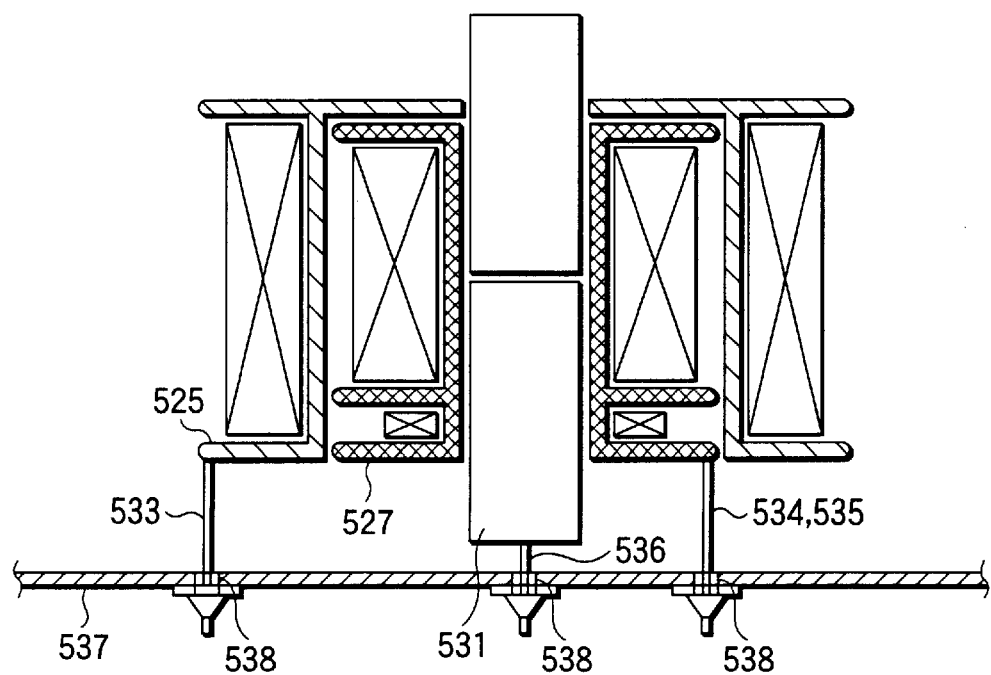
FIG. 20 is a sectional view of the step-up transformer unit in the 15th embodiment of the invention, wherein 525 is a primary bobbin, 527 is a secondary bobbin, 531 is an E-shaped magnetic substance, 533 is a primary winding terminal part, 534 is a secondary winding terminal part, 535 is a heater winding terminal part, 536 is a magnetic substance ground terminal part, 537 is a printed circuit board, and 538 is an insertion hole.

FIG. 18 is a diagram to show the configuration of a magnetron drive step-up transformer unit using a magnetron drive step-up transformer of the invention. FIGS. 19 and 20 are sectional views of the step-up transformer.

As shown in FIG. 18, a magnetron drive power supply consists of a magnetron 519, a high voltage doubler rectifier circuit section 520 for voltage doubler rectifying, a step-up transformer 521 for supplying stepped-up voltage to the magnetron 519, chassis ground 522, a switching circuit section 523 connected to the primary side of the step-up transformer 521, and a DC power supply 524.

As shown in FIG. 19, the step-up transformer 521 consists of a primary winding 526 wound around a primary bobbin 525, a secondary winding 528 and a heater winding 529 wound around a secondary bobbin 527, and E-shaped magnetic substances 530 and 531, and the primary winding 526, the secondary winding 528, and the heater winding 529 are wound as concentric layers with respect to a main magnetic circuit 532. As shown in FIG. 20, the primary bobbin 525 is provided with a primary winding terminal part 533 and the secondary bobbin 527 is provided with a secondary winding terminal part 534 and a heater winding terminal part 535; the primary winding terminal part 533 and the secondary winding terminal part 534 and the heater winding terminal part 535 are placed so as to face each other with the E-shaped magnetic substance 531 between. A magnetic substance ground terminal part 536 brought into contact with the E-shaped magnetic substance 531 is provided. The step-up transformer 521 is soldered and fixed with the terminal parts inserted into insertion holes 538 made in a printed circuit board 537 and the primary winding 526 is connected to the switching circuit 523, the secondary winding 528 is connected to the high voltage doubler rectifier circuit section 520, the heater winding 529 is connected to a heater of the magnetron 519, and the magnetic substance ground terminal part 536 of the E-shaped magnetic substance 531 is connected to the chassis ground 522.

Next, the operation and the function will be discussed. The primary bobbin 525 is provided with the primary winding terminal part 533, the secondary bobbin 527 is provided with the secondary winding terminal part 534 and the heater winding terminal part 535, and the primary winding terminal part 533 and the secondary winding terminal part 534 and the heater winding terminal part 535 are placed so as to face each other with the E-shaped magnetic substance 531 between. The magnetic substance ground terminal part 536 brought into contact with the E-shaped magnetic substance 531 is provided. Therefore, if dust should be deposited on the printed circuit board or dew condensation should occur on the printed circuit board due to salt air in a seaside area and a state should be entered in which margin discharge easily occurs in the direction of the primary winding terminal part 533 connected to the switching circuit section 523 from the secondary winding terminal part 534 and the heater winding terminal part 535 connected to the high voltage doubler rectifier circuit section 520 and the heater of the magnetron 519 at high potential, the E-shaped magnetic substance 531 intervenes between the primary winding terminal part 533 and the secondary winding terminal part 534 and the heater winding terminal part 535 and moreover the magnetic substance ground terminal part 536 of the E-shaped magnetic substance 531 is connected to the chassis ground 522, so that an electric current flows into the E-shaped magnetic substance 531 from the secondary winding terminal part 534 or the heater winding terminal part 535 and flows into the chassis ground 522 through the magnetic substance ground terminal part 536, preventing a high-voltage short circuit to the primary winding terminal part 533 connected to the switching circuit section 523.

In the description of the invention, the primary winding 526 is placed outside and the secondary winding 528 and the heater winding 529 are placed inside; however, if the primary winding 526 is placed inside and the secondary winding 528 and the heater winding 529 are placed outside, a similar advantage is provided, needless to say.

In the description of the invention, a pair of E-shaped magnetic substances is adopted or the magnetic substance is rectangular in cross section, but if a pair of EI-shaped magnetic substances is adopted or the magnetic substance is round or elliptic, a similar advantage is provided if the same terminal part and magnetic substance configuration is adopted, needless to say.

(12th Embodiment)

Figure 21:
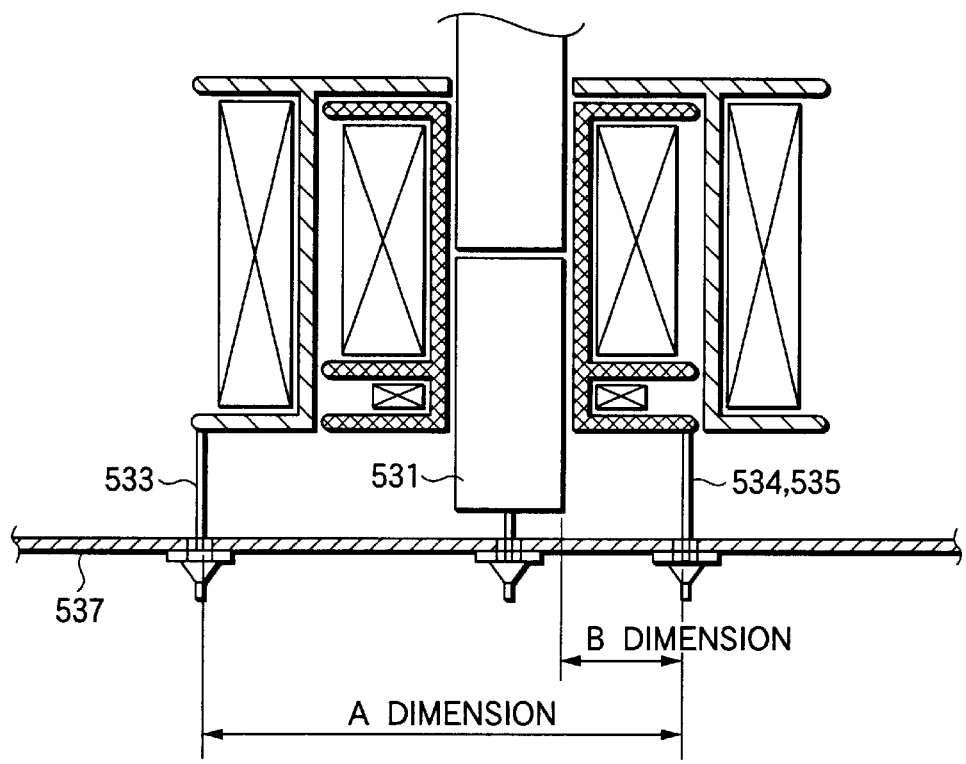
FIG. 21 is a sectional view of a step-up transformer unit in a 16th embodiment of the invention, wherein 531 is an E-shaped magnetic substance, 533 is a primary winding terminal part, 534 is a secondary winding terminal part, 535 is a heater winding terminal part, and 537 is a printed circuit board.
Figure 22:
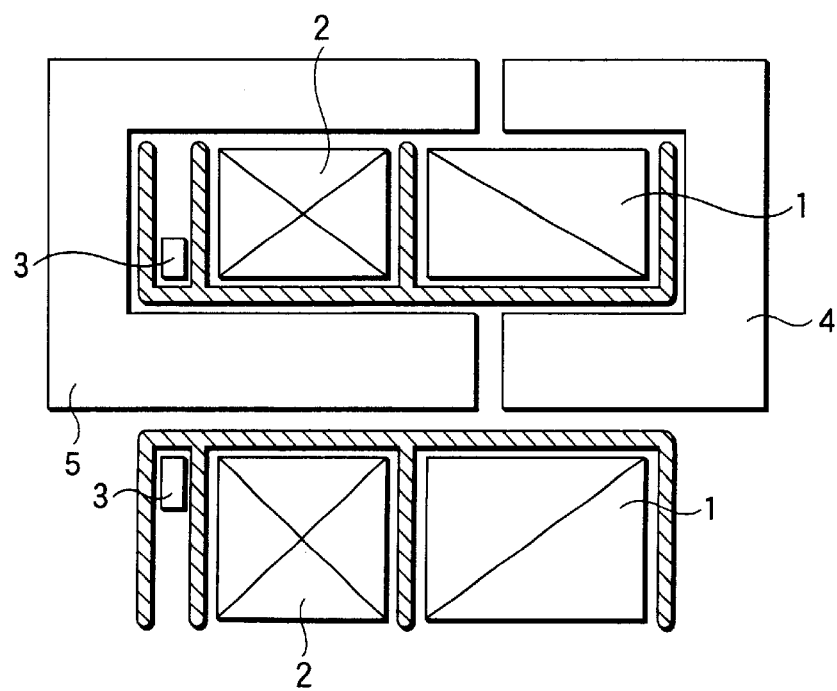
FIG. 22 is a schematic representation of a step-up transformer in a related art.
Figure 23:
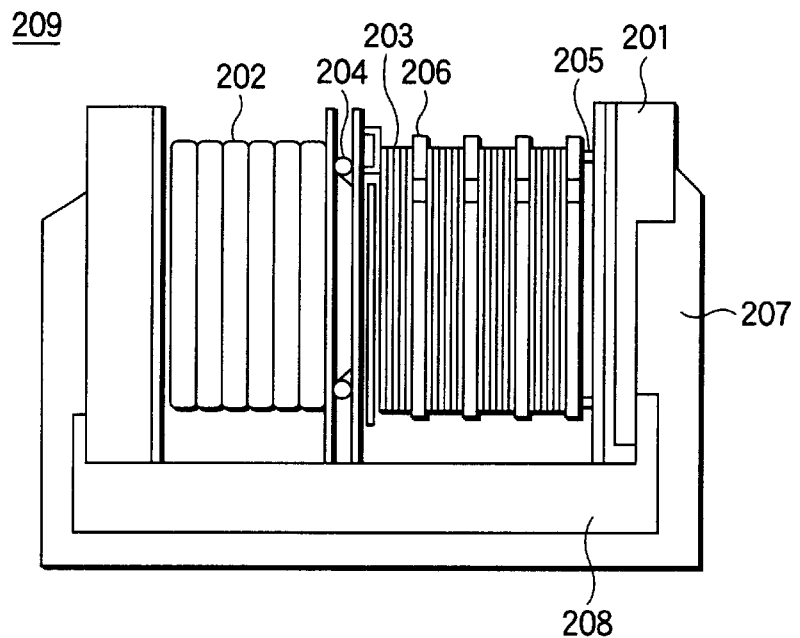
FIG. 23 is an external view to show the configuration of a transformer of a magnetron drive power supply in a related art.

FIG. 21 shows a magnetron drive step-up transformer of a 12th embodiment of the invention. Parts identical with those previously described with reference to FIGS. 19 and 20 are denoted by the same reference numerals in FIG. 21 and will not be discussed again.

In FIG. 21, letting the space distance between a primary winding terminal part 533 and a secondary winding terminal part 534 and a heater winding terminal part 535 be A dimension and the space distance between the secondary winding terminal part 534 and an E-shaped magnetic substance 531 be B dimension, the B dimension is made smaller than a half the A dimension.

Next, the operation and the function will be discussed. The B dimension is made smaller than a half the A dimension. Thus, if dust should be deposited on a printed circuit board or dew condensation should occur on the printed circuit board due to salt air in a seaside area and a state should be entered in which margin discharge easily occurs in the direction of the primary winding terminal part 533 connected to a switching circuit section 523 from the secondary winding terminal part 534 and the heater winding terminal part 535 connected to a high voltage doubler rectifier circuit section 520 and a heater of a magnetron 519 at high potential, an electric current flows more easily into the E-shaped magnetic substance 531 from the secondary winding terminal part 534 or the heater winding terminal part 535 and flows into chassis ground 522 through the magnetic substance ground terminal part 536, increasing the effect of preventing a high-voltage short circuit to the primary winding terminal part 533 connected to the switching circuit section 523.

INDUSTRIAL APPLICABILITY

As described above, according to the step-up transformer of the invention, it is made possible to control the leakage amount between the primary winding and the secondary winding in the presence of the subordinate magnetic circuit placed between the primary winding and the secondary winding, and concentric multilayer winding transformer can be used to provide any desired coupling coefficient.

According to the concentric multilayer winding transformer, the coupling between windings is strong, so that the magnetic substance can be made hard to be saturated even for a large current; the step-up transformer can be miniaturized even to provide large output.

Any desired coupling coefficient can be provided by adjusting the area, the length (gap length), etc., of the magnetic substance of the subordinate magnetic circuit and it is made possible to design the magnetic substance shape as desired in response to the structure and installation environment of the step-up transformer; an optimum step-up transformer shape can be manufactured.

As described above, according to the invention as in aspect 7 or 8, the transformer has the primary winding and the secondary winding concentrically with the primary winding placed outside and the secondary winding placed inside and has a predetermined space provided between the primary winding and the secondary winding, so that the primary winding which a large current flows into and generates large heat can be exposed largely to the atmosphere, thus the temperature performance (cooling performance) can be enhanced, and because of the space (air layer) provided between the primary winding and the secondary winding, the temperature performance of the secondary winding can also be improved without conducting the heat on the primary side to the secondary side for raising the winding temperature.

The electric insulation of the primary winding and the secondary winding can be more enhanced by providing the air layer; a still more improvement effect can also be produced on the safety.

According to the invention as in aspect 9, the bobbin of the primary winding is slid, inserted, and fitted into the inner diameter of the bobbin of the secondary winding, so that the parts can be manufactured separately and docked, winding around the inner bobbin and winding around the outer bobbin can be handled at the same time, and the manufacturing time can be shortened. By fitting and inserting, the relative positional relationship between the primary and secondary windings can be determined easily with accuracy, and variations in the electrical characteristics of the transformer are lessened.

As described above, according to the invention as claimed in any of aspects 10 to 12, the space factor can be lessened drastically.

As described above, according to the invention as in aspect 13, a highly reliable magnetron drive step-up transformer unit can be provided wherein the electric insulation strength of the primary circuit of the step-up transformer with voltage of a commercial power supply and the secondary circuit having the cabinet metal chassis as ground potential is provided, the magnetic coupling between the primary winding and the heater winding is intensified, variation in the filament current is lessened even at the power control time of the inverter, and the magnetron does not cause moding from low output to high output.

According to the invention as in aspect 14, a step-up transformer having any desired coupling coefficient can also be provided for the inverter technique wherein the operation does not normally function with a high coupling coefficient because of a leakage flux type step-up transformer comprising a subordinate magnetic circuit; advanced general versatility compatible with any inverter techniques can be provided.

As described above, according to the invention, if a state is entered in which margin discharge easily occurs in the direction of the terminal part of the first winding connected to the switching circuit from the terminal parts of the second and third windings connected to the high-voltage circuit and the heater of the magnetron at high potential, the terminal parts of the second and third windings face the terminal part of the first winding with the magnetic substance between, so that discharge occurs from the terminal parts of the second and third windings to the magnetic substance and an electric current flows into the chassis ground connected through the magnetic substance ground terminal from the magnetic substance, producing the effect of preventing a high-voltage short circuit to the terminal part of the first winding connected to the switching circuit.

What is claimed is:

1. A magnetron drive step-up transformer comprising:
   a step-up transformer for supplying a drive voltage to a magnetron; and
   a switching circuit being connected to a primary side of said step-up transformer, wherein said step-up transformer includes:
   a main magnetic circuit for concentrically layer-winding a primary winding and a secondary winding of said step-up transformer; and a subordinate magnetic circuit for generating a leakage flux in at least a part between the primary winding and the secondary winding, wherein said main magnetic circuit and said subordinate magnetic circuit are formed by combining a pair of E-shaped magnetic substances opposed to each other.

2. A magnetron drive step-up transformer comprising:
a step-up transformer for supplying a drive voltage to a magnetron; and
a switching circuit being connected to a primary side of said step-up transformer, wherein said step-up transformer includes:
   a main magnetic circuit for concentrically layer-winding a primary winding and a secondary winding of said step-up transformer; and
   a subordinate magnetic circuit for generating a leakage flux in at least a part between the primary winding and the secondary winding, wherein said main magnetic circuit and said subordinate magnetic circuit are formed by combining an E-shaped magnetic substance and an I-shaped magnetic substance opposed to each other.

3. The magnetron drive step-up transformer as claimed in claim 1 or 2, wherein
the magnetic substance forming said subordinate magnetic circuit has magnetic resistance changed in response to a necessary leakage flux amount.

4. The magnetron drive step-up transformer as claimed in claim 3, wherein
said magnetic resistance is changed based on the cross-sectional area of the magnetic substance.

5. The magnetron drive step-up transformer as claimed in claim 3, wherein
said magnetic resistance is changed based on a gap between the magnetic substances.

6. A transformer of a magnetron drive power supply comprising:
a step-up transformer for stepping up output of an inverter section, and
a high-voltage circuit for voltage-doubler-rectifying output of said step-up transformer, wherein
   said step-up transformer includes;
   a primary winding and a secondary winding concentrically with a predetermined space provided between said primary winding placed outside and said secondary winding placed inside.

7. The transformer of a magnetron drive power supply as claimed in claim 6, wherein
said secondary winding is wound around a plurality of winding grooves with a predetermined space insulation layer therebetween.

8. The transformer of a magnetron drive power supply as claimed in claim 6 or 7, wherein
a bobbin of said primary winding is slid, inserted, and fitted into the inner diameter of a bobbin of said secondary winding.

9. A magnetron drive step-up transformer comprising:
a primary winding,
a secondary winding being placed inside said primary winding with a predetermined gap therebetween, and
a subordinate magnetic circuit for generating a leakage flux between said primary winding and said secondary winding, wherein
   said subordinate magnetic circuit includes;
   an E-shaped magnetic substance placed at one end outside said primary winding and said secondary winding, and placed at an opposite end between said primary winding and said secondary winding.

10. The magnetron drive step-up transformer as claimed in claim 9, wherein
a thickness and a gap of the E-shaped magnetic substance are determined so that a coupling coefficient is set to 0.7 to 0.9 by adjusting magnetism of said subordinate magnetic circuit.

11. The magnetron drive step-up transformer as claimed in claim 9, wherein
a spacer placed in a gap of said subordinate magnetic circuit is molded integrally with an outer bobbin.

12. A magnetron drive step-up transformer unit comprising:
a magnetron,
a step-up transformer for supplying a drive voltage to said magnetron, and
a switching circuit being connected to the primary side of said step-up transformer, wherein
   said step-up transformer includes;
   three types of windings of a primary winding, a secondary winding, and a heater winding,
   magnetic substances for transferring power of said switching circuit as a magnetic flux from said primary winding to another winding,
   an outer bobbin around which said primary winding is wound, and
   an inner bobbin around which said secondary winding and said heater winding are around, said inner bobbin being placed inside said outer bobbin, said windings being wound as concentric layers with respect to a magnetic circuit of the magnetic substance.

13. The magnetron drive step-up transformer unit as claimed in claim 12, wherein
said windings are wound as concentric layers with respect to the magnetic substance forming a main magnetic circuit, and
said outer bobbin and the magnetic substance forming a subordinate magnetic circuit are between said primary winding and said secondary winding and said heater winding.

14. A magnetron drive step-up transformer unit comprising:
a magnetron,
a high-voltage circuit for supplying a high voltage to said magnetron,
a step-up transformer for supplying a drive voltage to a heater of said magnetron and said high-voltage circuit,
a switching circuit being connected to the primary side of said step-up transformer, and
a printed circuit board on which said high-voltage circuit, said heater of said magnetron, and said switching circuit are print-wired for fixing said step-up transformer wherein
   a first winding, a second winding, and a third winding of said step-up transformer are wound as concentric layers around two or more bobbins with respect to a magnetic substance forming a magnetic circuit,
   said bobbins are provided at appropriate positions with terminal parts of said windings, one of said bobbins is provided with a terminal part of magnetic substance ground brought into contact with the magnetic substance, the terminal part of said first winding and the terminal parts of said second and third windings are placed so as to face each other with the magnetic substance between, said winding terminal parts of said step-up transformer are soldered and fixed to said printed circuit board, and said first winding is connected to said switching circuit, said second and third windings are connected to said high-voltage circuit and said heater of said magnetron, and the terminal part of the magnetic substance ground is connected to chassis ground.

15. The magnetron drive step-up transformer unit as claimed in claim 14, wherein the space distance between the terminal part of said second winding and the magnetic substance is made smaller than a half the space distance between the terminal part of said first winding and the terminal part of said second winding, and the space distance between the terminal part of said third winding and the magnetic substance is made smaller than a half the space distance between the terminal part of said first winding and the terminal part of said third winding.

* * * * *